United States Patent
Gao et al.

(10) Patent No.: US 11,139,940 B2
(45) Date of Patent: Oct. 5, 2021

(54) ACK/NACK FEEDBACK METHOD AND ASSOCIATED APPARATUS

(71) Applicant: China Academy of Telecommunications Technology, Beijing (CN)

(72) Inventors: Xuejuan Gao, Beijing (CN); Fang-Chen Cheng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 270 days.

(21) Appl. No.: 16/088,117

(22) PCT Filed: Mar. 1, 2017

(86) PCT No.: PCT/CN2017/075354
§ 371 (c)(1),
(2) Date: Sep. 25, 2018

(87) PCT Pub. No.: WO2017/162008
PCT Pub. Date: Sep. 28, 2017

(65) Prior Publication Data
US 2019/0109692 A1      Apr. 11, 2019

(30) Foreign Application Priority Data
Mar. 25, 2016    (CN) .......................... 201610180321.3

(51) Int. Cl.
*H04L 5/00*       (2006.01)
*H04L 1/18*       (2006.01)
(Continued)

(52) U.S. Cl.
CPC .............. *H04L 5/0055* (2013.01); *H04L 1/18* (2013.01); *H04L 1/1854* (2013.01);
(Continued)

(58) Field of Classification Search
None
See application file for complete search history.

(56) References Cited

U.S. PATENT DOCUMENTS

2011/0002309 A1    1/2011  Park et al.
2012/0210187 A1*   8/2012  Yin ....................... H04L 1/1671
                                                                 714/751
(Continued)

FOREIGN PATENT DOCUMENTS

CN        101729128 A       6/2010
CN        101997663 A       3/2011
(Continued)

OTHER PUBLICATIONS

Intel Corporat Ion : "UCI and DL HARQ-ACK feedback for NB-loT", 3GPP Draft; R1-161902—Intel NB-loT UCI DLHARQ, 3rd Generation Partnership Project (3GPP), Mobile Competence Centre, 650, Route Des Lucioles ; F-06921 Sophia-Antipol is Cedex ; France, on Mar. 16, 2016, 7 pages.
(Continued)

*Primary Examiner* — James P Duffy
(74) *Attorney, Agent, or Firm* — Kilpatrick Townsend & Stockton LLP

(57) ABSTRACT

The application discloses an ACK/NACK feedback method and an associated apparatus serving to resolve the problem arising from data in different transmission time intervals having different transmission and processing latencies, leading to different earliest time points to transmit an ACK/NACK feedback message, and subsequently resulting in being unable to ensure normal ACK/NACK feedback in downlink transmission. The method comprises: a terminal receives a first physical downlink control channel having downlink control information containing a first indication field, the first indication field indicating a time-domain position of ACK/NACK feedback message; and the terminal (Continued)

determines, according to the first indication field, the first physical downlink control channel or the time-domain position of the ACK/NACK feedback message of a first physical downlink shared channel corresponding to the first physical downlink control channel, and transmits, at the time-domain position of the ACK/NACK feedback message, the ACK/NACK feedback message.

16 Claims, 11 Drawing Sheets

(51) Int. Cl.
    *H04W 72/04*     (2009.01)
    *H04L 5/14*     (2006.01)

(52) U.S. Cl.
    CPC .............. *H04L 1/1861* (2013.01); *H04L 5/00* (2013.01); *H04L 5/0082* (2013.01); *H04L 5/0091* (2013.01); *H04W 72/04* (2013.01); *H04W 72/042* (2013.01); *H04W 72/0446* (2013.01); *H04L 5/001* (2013.01); *H04L 5/14* (2013.01)

(56) References Cited

U.S. PATENT DOCUMENTS

| | | |
|---|---|---|
| 2013/0235768 A1 | 9/2013 | Earnshaw |
| 2014/0328333 A1 | 11/2014 | Seo et al. |
| 2015/0237619 A1 | 8/2015 | Yang et al. |
| 2018/0270794 A1* | 9/2018 | Tiirola .................. H04L 5/0051 |
| 2018/0367278 A1* | 12/2018 | Chatterjee ............. H04L 5/0091 |
| 2019/0215856 A9* | 7/2019 | Nory ..................... H04L 1/1893 |

FOREIGN PATENT DOCUMENTS

| | | |
|---|---|---|
| CN | 102082641 A | 6/2011 |
| CN | 102170338 A | 8/2011 |
| CN | 103179672 A | 6/2013 |
| CN | 104247313 A | 12/2014 |
| CN | 104798429 A | 7/2015 |
| JP | 2017511016 A | 4/2017 |
| WO | 2015104767 A1 | 7/2015 |

OTHER PUBLICATIONS

Nokia Networks et al: "Considerations of FOO DL HARQ for Supporting Latency Reduction", 3GPP Draft; R1-160798 Considerations of FOO DL HARQ for Supporting Latency Reduction Final, 3rd Generation Partnership Project (3GPP), Mobile Competence Centre, 650, Route Des Lucioles ; F-06921 SOPH, on Feb. 14, 2016, 4 Pages.

Huawei et al: "Detailed solution for dynamic HARQ-ACK Codebook determination", 3GPP Draft; R1-155092, 3rd Generation Partnership Project (3GPP), Mobile Competence Centre ; 650, Route Des Lucioles ; F-06921 Sophia-Antipolis Cedex; France, on Oct. 4, 2015, 6 Pages.

Huawei et al., "Short TTI for DL transmissions", 3GPP TSG RAN WG1 Meeting #84, St Julian's, Malta, Feb. 15-19, 2016, total 7 pages, R1-160292.

* cited by examiner

```
                                                    ┌─301
┌──────────────────────────────────────────────────────┐
│ A terminal receives a first physical downlink control channel, where │
│ Downlink Control Information (DCI) of the first physical downlink │
│ control channel carries a first indication field for determining a time │
│     domain position of ACK/NACK feedback information     │
└──────────────────────────────────────────────────────┘
```

```
                                                    ┌─302
┌──────────────────────────────────────────────────────┐
│    The terminal determines a time domain position of ACK/NACK    │
│   feedback information of the first physical downlink control channel   │
│     or the first physical downlink shared channel corresponding to the     │
│      first physical downlink control channel according to the first      │
│  indication field, and transmits the ACK/NACK feedback information  │
│   at the time domain position of the ACK/NACK feedback information   │
└──────────────────────────────────────────────────────┘
```

Fig. 3A

```
                                                    ┌─401
┌──────────────────────────────────────────────────────┐
│ A base station transmits a first physical downlink control channel to a │
│    terminal, where Downlink Control Information (DCI) of the first    │
│   physical downlink control channel carries a first indication field for   │
│             determining a time domain position of ACK/NACK feedback             │
│                              information                              │
└──────────────────────────────────────────────────────┘
```

```
                                                    ┌─402
┌──────────────────────────────────────────────────────┐
│    The base station receives ACK/NACK feedback information, fed    │
│  back by the terminal, of the first physical downlink control channel or  │
│     a first physical downlink shared channel corresponding to the first     │
│    physical downlink control channel at the time domain position, of the    │
│     ACK/NACK feedback information, determined according to the first     │
│                            indication field                            │
└──────────────────────────────────────────────────────┘
```

Fig. 3B

ACK/NACK FEEDBACK METHOD AND ASSOCIATED APPARATUS

CROSS-REFERENCE TO RELATED APPLICATIONS

This application is a National Stage of International Application No. PCT/CN2017/075354, filed Mar. 1, 2017, which claims priority to Chinese Patent Application No. 201610180321.3, filed Mar. 25, 2016, both of which are hereby incorporated by reference in their entireties.

FIELD

The present application relates to the field of communications, and particularly to a method and device for feeding back ACK/NACK.

BACKGROUND

I. The Existing LTE Frame Structures (in the LTE Rel-8/9/10/11/12/13).

The Frame Structure Type 1 (FS1) is applicable to the existing Long Term Evolution (LTE) Frequency Division Duplex (FDD) system. In the FDD system, there are different carrier frequencies and the same frame structure for uplink and downlink transmission. FIG. 1 illustrates a schematic structural diagram of the FS1, a radio frame with a length of 10 ms over each carrier includes ten 1 ms sub-frames, each sub-frame includes two slots with a length of 0.5 ms, and there is a Transmission Time Interval (TTI) of 1 ms between uplink and downlink data to be transmitted.

The Frame Structure Type 2 (FS2) is applicable to the existing LTE Time Division Duplex (TDD) system. In the TDD system, there are different sub-frames or slots at the same frequency for uplink and downlink transmission. FIG. 2 illustrates a schematic structural diagram of the FS2. In the FS2, each radio frame with a length of 10 ms includes two half-frames with a length of 5 ms, and each half-frame includes five sub-frames with a length of 1 ms. The sub-frames in the FS2 are categorized into downlink sub-frames, uplink sub-frames, and special sub-frames, where each special sub-frame includes three components of a Downlink Pilot Time Slot (DwPTS), a Guard Period (GP), and an Uplink Pilot Time Slot (UpPTS); where a downlink pilot, downlink service data and downlink control signaling can be transmitted in the DwPTS; no signal is transmitted in the GP; and only a random access signal and a Sounding Reference Symbol (SRS) can be transmitted, but neither uplink service data nor uplink control information can be transmitted in the UpPTS. Each half-frame includes at least one downlink sub-frame, at least one uplink sub-frame and at most one special sub-frame. Table 1 depicts seven uplink-downlink sub-frame configurations supported in the FS2.

TABLE 1

| Uplink-downlink configurations. | | | | | | | | | | | |
|---|---|---|---|---|---|---|---|---|---|---|---|
| Uplink-downlink config-uration | Downlink-to-Uplink Switch-point periodicity | Sub-frame number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

II. Acknowledgment/Negative Acknowledgement (ACK/NACK) Feedback Timing in the Existing LTE FDD-TDD System.

In the LTE Rel-8 system, for the FDD system, there is an uplink resource in each sub-frame, so ACK/NACK feedback information of a downlink sub-frame with the number n is transmitted in an uplink sub-frame with the number n+4. For the TDD system, frequency resources are shared for uplink and downlink transmission, so sub-frames shall be categorized into uplink and downlink sub-frames as depicted in Table 1, so that ACK/NACK feedback information of different downlink sub-frames may have to be transmitted in the same uplink sub-frame, and as depicted in Table 2, downlink sub-frames for which ACK/NACK is to be fed back in an uplink sub-frame with the number n (including a downlink sub-frame with the number n-k, which includes a special sub-frame) can be determined according to respective elements in a set K: $\{k_0, k_1, \ldots, k_{M-1}\}$ corresponding to the uplink sub-frame, so ACK/NACK feedback information of M downlink sub-frames shall be fed back in the same uplink sub-frame, where M is the quantity of elements in the set K, and may take different values for different uplink sub-frames and different TDD uplink-downlink configurations.

TABLE 2

| Downlink association set index K: $\{k_0, k_1, \ldots k_{M-1}\}$ for TDD. | | | | | | | | | | |
|---|---|---|---|---|---|---|---|---|---|---|
| UL-DL Config-uration | Sub-frame n | | | | | | | | | |
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It shall be noted that the numbers in Table 2 are set in the unit of a radio frame, and if the number n-k of a sub-frame is less than zero, for example, then it will indicate that the sub-frame belongs to a preceding radio frame.

When carriers are aggregated, a terminal can operate concurrently over a plurality of carriers, but can only transmit ACK/NACK feedback information in a Physical Uplink Control Channel (PUCCH) over a part of the carriers, e.g., a Primary Component Carrier (PCC). Accordingly the terminal further needs to feed back ACK/NACK feedback information corresponding to the plurality of carriers in an uplink sub-frame. When all the carriers aggregated for the terminal are FDD carriers, ACK/NACK feedback timing over each carrier is determined as per n+4. When all the carriers aggregated for the terminal are TDD carriers, if the same TDD uplink-downlink configuration is applied to all the TDD carriers, then ACK/NACK feedback timing over each carrier will be determined according to the feedback timing as depicted in Table 2 corresponding to the TDD uplink-downlink configuration; and if there are different TDD uplink-downlink configurations of the aggregated TDD carriers, then a reference TDD uplink-downlink configuration will be defined for a Secondary Component Carrier (SCC) under a specific rule, and ACK/NACK feedback will be made according to the feedback timing as depicted in Table 2 corresponding to the reference TDD uplink-downlink configuration. When the carriers aggregated for the terminal include both the FDD carrier(s) and the TDD carrier(s), if one of the FDD carrier(s) is a PCC, then ACK/NACK feedback timing over each carrier will be determined as per n+4; and if one of the TDD carrier(s) is a PCC, then a reference TDD uplink-downlink configuration will be defined for an SCC under a specific rule, and ACK/NACK feedback will be made according to the feedback timing as depicted in Table 2 corresponding to the reference TDD uplink-downlink configuration.

In a subsequent release, aggregated carriers can be further grouped into a plurality of carrier groups, and ACK/NACK feedback can be made in a PUCCH over one of the carriers in each carrier group; and at this time, feedback timing of an SCC in each carrier group can be determined according to one of the instances above corresponding to the aggregated carriers in the carrier group.

In the LTE system, the existing channel transmission is generally defined with TTI=1 ms, and when another TTI length than 1 ms is applied, the length of a TTI for downlink transmission may be changed. There are different transmission delays and processing delays required of data with different TTI lengths, so there are different time positions at which ACK/NACK feedback can be made at the earliest. In this case, the method for feeding back ACK/NACK according to fixed ACK/NACK feedback timing in the existing mechanism will not be applicable any longer, and it is desirable to provide a new mechanism for determining a time position for transmitting ACK/NACK for downlink transmission, so that the ACK/NACK for downlink transmission can be fed back normally.

SUMMARY

Embodiments of the application provide a method and device for feeding back ACK/NACK so as to address the problem in the prior art that there are different transmission and processing delays required of data with different TTI lengths, so there are different time positions at which ACK/NACK feedback can be made at the earliest, and thus ACK/NACK for downlink transmission may not be fed back normally.

Particular technical solutions according to the embodiments of the application are as follows.

In a first aspect, the embodiments of the application provide a method for feeding back ACK/NACK, the method including: receiving, by a terminal, a first physical downlink control channel, where Downlink Control Information (DCI) of the first physical downlink control channel carries a first indication field for determining a time domain position of ACK/NACK feedback information; and determining, by the terminal, a time domain position of ACK/NACK feedback information of the first physical downlink control channel or a first physical downlink shared channel corresponding to the first physical downlink control channel according to the first indication field, and transmitting the ACK/NACK feedback information at the time domain position of the ACK/NACK feedback information.

In a possible implementation, the first indication field indicates K time domain positions at which ACK/NACK feedback information is able to be transmitted, wherein K is a positive integer.

In a possible implementation, the first indication field includes P bits of information, wherein $P=\lceil \log_2 K \rceil$, and "$\lceil \ \rceil$" represents rounding up.

In a possible implementation, the first indication field indicates a position of a radio frame or a half-frame or a sub-frame or a slot or a Transmission Time Interval (TTI) or a mini-slot or a symbol including the time domain position for transmitting the ACK/NACK feedback information.

In a possible implementation, the method further includes: determining, by the terminal, a position of a radio frame or a half-frame or a sub-frame or a slot or a mini-slot or a symbol including the time domain position of the ACK/NACK feedback information indicated by the first indication field, according to a first TTI length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

In a possible implementation, the method further includes: determining, by the terminal, a position of a radio frame or a half-frame or a sub-frame or a TTI or a slot or a mini-slot or a symbol including the time domain position of the ACK/NACK feedback information indicated by the first indication field, according to a magnitude or sequential order between an index of a sub-frame and/or a TI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

In a possible implementation, the time domain position of the ACK/NACK feedback information is one or a combination of the following instances: the radio frame including the time domain position of the ACK/NACK feedback information is a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, wherein n1 is a positive integer; the half-frame including the time domain position of the ACK/NACK feedback information is a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, wherein n2 is a positive integer; the sub-frame including the time domain position of the ACK/NACK feedback information is a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, wherein n3 is a positive integer; the slot including the time domain position of the ACK/NACK feedback information is a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, wherein n4 is a positive integer; the mini-slot including the time domain position of the ACK/NACK feedback information is a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, wherein n5 is a positive integer; the TTI including the time domain position of the ACK/NACK feedback information is a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, wherein n6 is a positive integer; and the symbol including the time domain position of the ACK/NACK feedback information is a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, wherein n7 is a positive integer.

In a possible implementation, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first TI to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame.

In a possible implementation, if the terminal determines a same time domain position of ACK/NACK feedback information respectively according to first indication fields of a plurality of first physical downlink channels, then transmitting, by the terminal, the ACK/NACK feedback information at the time domain position of the ACK/NACK feedback information includes: concatenating, by the terminal, ACK/NACK feedback information of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels; and transmitting, by the terminal, a concatenated ACK/NACK feedback information at the same time domain position of the ACK/NACK feedback information.

In a possible implementation, the time domain position is any one of: an index of a sub-frame and/or an index of a symbol and/or an index of a TTI and/or an index of a slot and/or an index of a mini-slot.

In a second aspect, the embodiments of the application provide a method for feeding back ACK/NACK, the method including: transmitting, by a base station, a first physical downlink control channel to a terminal, wherein Downlink Control Information (DCI) of the first physical downlink control channel carries a first indication field for determining a time domain position of the ACK/NACK feedback information; and receiving, by the base station, ACK/NACK feedback information, fed back by the terminal, of the first physical downlink control channel or a first physical downlink shared channel corresponding to the first physical downlink control channel, at the time domain position of the ACK/NACK feedback information determined according to the first indication field.

In a possible implementation, the first indication field indicates K time domain positions at which ACK/NACK feedback information is able to be transmitted, wherein K is a positive integer.

In a possible implementation, the first indication field includes P bits of information, wherein $P=\lceil \log_2 K \rceil$, and "$\lceil \ \rceil$" represents rounding up.

In a possible implementation, the first indication field indicates a position of a radio frame or a half-frame or a sub-frame or a slot or a Transmission Time Interval (TTI) or a mini-slot or a symbol including the time domain position for transmitting the ACK/NACK feedback information.

In a possible implementation, the method further includes: determining, by the base station, a position of a radio frame or a half-frame or a sub-frame or a slot or a mini-slot or a symbol including the time domain position of the ACK/NACK feedback information indicated by the first indication field, according to a first TTI length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

In a possible implementation, the method further includes: determining, by the base station, a position of a radio frame or a half-frame or a sub-frame or a TI or a slot or a mini-slot or a symbol including the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

In a possible implementation, the time domain position of the ACK/NACK feedback information is one or a combination of the following instances: the radio frame including the time domain position of the ACK/NACK feedback information is a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, wherein n1 is a positive integer; the half-frame including the time domain position of the ACK/NACK feedback information is a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, wherein n2 is a positive integer; the sub-frame including the time domain position of the ACK/NACK feedback information is a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, wherein n3 is a positive integer; the slot including the time domain position of the ACK/NACK feedback information is a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, wherein n4 is a positive integer; the mini-slot including the time domain position of the ACK/NACK feedback information is a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, wherein n5 is a positive integer; the TTI including the time domain position of the ACK/NACK feedback information is a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, wherein n6 is a positive integer; and the symbol including the time domain position of the ACK/NACK feedback information is a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, wherein n7 is a positive integer.

In a possible implementation, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first TTI to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame.

In a possible implementation, if the base station determines a same time domain position of ACK/NACK feedback information indicated by first indication fields of a plurality of first physical downlink channels of the terminal, then the method further includes: determining, by the base station, a concatenation order of ACK/NACK feedback information, of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels, and parsing ACK/NACK feedback information received at the same time domain position according to the determined concatenation order.

In a possible implementation, the time domain position is any one of: an index of a sub-frame and/or an index of a symbol and/or an index of a TTI and/or an index of a slot and/or an index of a mini-slot.

In a third aspect, the embodiments of the application provide a terminal including: a receiving module configured to receive a first physical downlink control channel, where Downlink Control Information (DCI) of the first physical downlink control channel carries a first indication field for determining a time domain position of ACK/NACK feedback information; and a feedback module configured to determine a time domain position of ACK/NACK feedback information of the first physical downlink control channel or a first physical downlink shared channel corresponding to the first physical downlink control channel according to the first indication field, and to transmit the ACK/NACK feedback information at the time domain position of the ACK/NACK feedback information.

In a possible implementation, the first indication field indicates K time domain positions at which ACK/NACK feedback information is able to be transmitted, wherein K is a positive integer.

In a possible implementation, the first indication field includes P bits of information, wherein P=⌈log$_2$ K⌉, and "⌈ ⌉" represents rounding up.

In a possible implementation, the first indication field indicates a position of a radio frame or a half-frame or a sub-frame or a slot or a Transmission Time Interval (TTI) or a mini-slot or a symbol including the time domain position for transmitting the ACK/NACK feedback information.

In a possible implementation, the feedback module is further configured to determine a position of a radio frame or a half-frame or a sub-frame or a slot or a mini-slot or a symbol including the time domain position of the ACK/NACK feedback information indicated by the first indication field, according to a first TTI length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

In a possible implementation, the feedback module is further configured to determine a position of a radio frame or a half-frame or a sub-frame or a TTI or a slot or a mini-slot or a symbol including the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

In a possible implementation, the time domain position of the ACK/NACK feedback information is one or a combination of the following instances: the radio frame including the time domain position of the ACK/NACK feedback information is a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, wherein n1 is a positive integer; the half-frame including the time domain position of the ACK/NACK feedback information is a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, wherein n2 is a positive integer; the sub-frame including the time domain position of the ACK/NACK feedback information is a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, wherein n3 is a positive integer; the slot including the time domain position of the ACK/NACK feedback information is a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, wherein n4 is a positive integer: the mini-slot including the time domain position of the ACK/NACK feedback information is a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, wherein n5 is a positive integer; the TTI including the time domain position of the ACK/NACK feedback information is a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, wherein n6 is a positive integer; and the symbol including the time domain position of the ACK/NACK feedback information is a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, wherein n7 is a positive integer.

In a possible implementation, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first TTI to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame.

In a possible implementation, the feedback module is configured: if the terminal determines a same time domain position of ACK/NACK feedback information respectively according to first indication fields of a plurality of first physical downlink channels, to concatenate ACK/NACK feedback information of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels; and to transmit a concatenated ACK/NACK feedback information at the same time domain position of the ACK/NACK feedback information.

In a possible implementation, the time domain position is any one of: an index of a sub-frame and/or an index of a symbol and/or an index of a TTI and/or an index of a slot and/or an index of a mini-slot.

In a fourth aspect, the embodiments of the application provide a base station including: a transmitting module configured to transmit a first physical downlink control channel to a terminal, wherein Downlink Control Information (DCI) of the first physical downlink control channel carries a first indication field for determining a time domain position of ACK/NACK feedback information; and a receiving module configured to receive ACK/NACK feedback information, fed back by the terminal, of the first physical downlink control channel or a first physical downlink shared channel corresponding to the first physical downlink control channel, at the time domain position of the ACK/NACK feedback information determined according to the first indication field.

In a possible implementation, the first indication field indicates K time domain positions at which ACK/NACK feedback information is able to be transmitted, wherein K is a positive integer.

In a possible implementation, the first indication field includes P bits of information, wherein $P=\lceil \log_2 K \rceil$, and "$\lceil \ \rceil$" represents rounding up.

In a possible implementation, the first indication field indicates a position of a radio frame or a half-frame or a sub-frame or a slot or a Transmission Time Interval (TTI) or a mini-slot or a symbol including the time domain position for transmitting the ACK/NACK feedback information.

In a possible implementation, the base station further includes a processing module configured to determine a position of a radio frame or a half-frame or a sub-frame or a slot or a mini-slot or a symbol comprising the time domain position of the ACK/NACK feedback information indicated by the first indication field, according to a first Transmission Time Interval (TTI) length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

In a possible implementation, the base station further includes a processing module configured to determine a position of a radio frame or a half-frame or a sub-frame or a Transmission Time Interval (TTI) or a slot or a mini-slot or a symbol comprising the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot comprising the time domain position of the ACK/NACK feedback information indicated by the first indication field.

In a possible implementation, the time domain position of the ACK/NACK feedback information is one or a combination of the following instances: the radio frame including the time domain position of the ACK/NACK feedback information is a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, wherein n1 is a positive integer; the half-frame including the time domain position of the ACK/NACK feedback information is a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, wherein n2 is a positive integer; the sub-frame including the time domain position of the ACK/NACK feedback information is a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, wherein n3 is a positive integer; the slot including the time domain position of the ACK/NACK feedback information is a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, wherein n4 is a positive integer; the mini-slot including the time domain position of the ACK/NACK feedback information is a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, wherein n5 is a positive integer; the TTI including the time domain position of the ACK/NACK feedback information is a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, wherein n6 is a positive integer; and the symbol including the time domain position of the ACK/NACK feedback information is a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, wherein n7 is a positive integer.

In a possible implementation, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first TTI to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame.

In a possible implementation, the base station further includes a processing module configured: if the base station determines a same time domain position of ACK/NACK feedback information indicated by first indication fields of a plurality of first physical downlink channels of the terminal, to determine a concatenation order of ACK/NACK feedback information, of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels, and to parse ACK/NACK feedback information received at the same time domain position according to the determined concatenation order.

In a possible implementation, the time domain position is any one of: an index of a sub-frame and/or an index of a symbol and/or an index of a TTI and/or an index of a slot and/or an index of a mini-slot.

In a fifth aspect, the embodiments of the application further provide another terminal including a processor, a memory, and a transceiver, wherein: the processor is configured to receive and transmit data under the control of the processor, the memory is configured to store preset programs, and the processor is configured to execute the programs stored in the memory to: to receive a first physical downlink control channel through the transceiver, where Downlink Control Information (DCI) of the first physical downlink control channel carries a first indication field for determining a time domain position of ACK/NACK feedback information; and to determine a time domain position of ACK/NACK feedback information of the first physical downlink control channel or a first physical downlink shared channel corresponding to the first physical downlink control channel according to the first indication field, and to instruct the transceiver to transmit the ACK/NACK feedback information at the time domain position of the ACK/NACK feedback information.

In a possible implementation, the first indication field indicates K time domain positions at which ACK/NACK feedback information is able to be transmitted, wherein K is a positive integer.

In a possible implementation, the first indication field includes P bits of information, wherein P=$\lceil \log_2 K \rceil$, and "$\lceil$ $\rceil$" represents rounding up.

In a possible implementation, the first indication field indicates a position of a radio frame or a half-frame or a sub-frame or a slot or a Transmission Time Interval (TTI) or a mini-slot or a symbol including the time domain position for transmitting the ACK/NACK feedback information.

In a possible implementation, the processor is further configured to determine a position of a radio frame or a half-frame or a sub-frame or a slot or a mini-slot or a symbol including the time domain position of the ACK/NACK feedback information indicated by the first indication field, according to a first TTI length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

In a possible implementation, the processor is further configured to determine a position of a radio frame or a half-frame or a sub-frame or a TTI or a slot or a mini-slot or a symbol including the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

In a possible implementation, the time domain position of the ACK/NACK feedback information is one or a combination of the following instances: the radio frame including the time domain position of the ACK/NACK feedback information is a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, wherein n1 is a positive integer; the half-frame including the time domain position of the ACK/NACK feedback information is a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, wherein n2 is a positive integer; the sub-frame including the time domain position of the ACK/NACK feedback information is a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, wherein n3 is a positive integer; the slot including the time domain position of the ACK/NACK feedback information is a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, wherein n4 is a positive integer; the mini-slot including the time domain position of the ACK/NACK feedback information is a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, wherein n5 is a positive integer; the TTI including the time domain position of the ACK/NACK feedback information is a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, wherein n6 is a positive integer; and the symbol including the time domain position of the ACK/NACK feedback information is a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, wherein n7 is a positive integer.

In a possible implementation, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first TTI to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame.

In a possible implementation, the processor is configured: if the terminal determines a same time domain position of ACK/NACK feedback information respectively according to first indication fields of a plurality of first physical downlink channels, to concatenate ACK/NACK feedback information of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels; and to transmit a concatenated ACK/NACK feedback information at the same time domain position of the ACK/NACK feedback information.

In a possible implementation, the time domain position is any one of: an index of a sub-frame and/or an index of a symbol and/or an index of a TTI and/or an index of a slot and/or an index of a mini-slot.

In a sixth aspect, the embodiments of the application further provide another base station including a processor, a memory, and a transceiver, wherein: the processor is configured to receive and transmit data under the control of the processor, the memory is configured to store preset programs, and the processor is configured to execute the programs stored in the memory to: transmit a first physical downlink control channel to a terminal through the transceiver, wherein Downlink Control Information (DCI) of the first physical downlink control channel carries a first indication field for determining a time domain position of ACK/NACK feedback information; and to instruct the transceiver to receive ACK/NACK feedback information, fed back by the terminal, of the first physical downlink control channel or a first physical downlink shared channel corresponding to the first physical downlink control channel, at the time domain position of the ACK/NACK feedback information determined according to the first indication field.

In a possible implementation, the first indication field indicates K time domain positions at which ACK/NACK feedback information is able to be transmitted, wherein K is a positive integer.

In a possible implementation, the first indication field includes P bits of information, wherein P=⌈$\log_2$ K⌉, and "⌈ ⌉" represents rounding up.

In a possible implementation, the first indication field indicates a position of a radio frame or a half-frame or a sub-frame or a slot or a Transmission Time Interval (TTI) or a mini-slot or a symbol including the time domain position for transmitting the ACK/NACK feedback information.

In a possible implementation, the processor is further configured to determine a position of a radio frame or a half-frame or a sub-frame or a slot or a mini-slot or a symbol comprising the time domain position of the ACK/NACK feedback information indicated by the first indication field, according to a first Transmission Time Interval (TTI) length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

In a possible implementation, the processor is further configured to determine a position of a radio frame or a half-frame or a sub-frame or a Transmission Time Interval (TTI) or a slot or a mini-slot or a symbol comprising the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot comprising the time domain position of the ACK/NACK feedback information indicated by the first indication field.

In a possible implementation, the time domain position of the ACK/NACK feedback information is one or a combination of the following instances: the radio frame including the time domain position of the ACK/NACK feedback information is a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, wherein n1 is a positive integer; the half-frame including the time domain position of the ACK/NACK feedback information is a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, wherein n2 is a positive integer; the sub-frame including the time domain position of the ACK/

NACK feedback information is a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, wherein n3 is a positive integer; the slot including the time domain position of the ACK/NACK feedback information is a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, wherein n4 is a positive integer; the mini-slot including the time domain position of the ACK/NACK feedback information is a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, wherein n5 is a positive integer; the TTI including the time domain position of the ACK/NACK feedback information is a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, wherein n6 is a positive integer; and the symbol including the time domain position of the ACK/NACK feedback information is a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, wherein n7 is a positive integer.

In a possible implementation, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first TTI to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame.

In a possible implementation, the processor is further configured: if the base station determines a same time domain position of ACK/NACK feedback information indicated by first indication fields of a plurality of first physical downlink channels of the terminal, to determine a concatenation order of ACK/NACK feedback information, of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels, and to parse ACK/NACK feedback information received at the same time domain position according to the determined concatenation order.

In a possible implementation, the time domain position is any one of: an index of a sub-frame and/or an index of a symbol and/or an index of a TTI and/or an index of a slot and/or an index of a mini-slot.

With the technical solutions above, in the embodiments of the application, the time domain position for transmitting the ACK/NACK feedback information can be signaled in the physical downlink control channel so that the eNB can control flexibly an ACK/NACK load to be balanced over different uplink transmission resources, while shortening a feedback delay as many as possible, to thereby improve the performance of the system.

BRIEF DESCRIPTION OF THE DRAWINGS

FIG. 3A is a schematic flow chart of a method for feeding back ACK/NACK at a terminal side according to embodiments of the application:

FIG. 3B is a schematic flow chart of a method for obtaining ACK/NACK feedback information at a base station side according to the embodiments of the application;

DETAILED DESCRIPTION OF THE EMBODIMENTS

Figure 1:
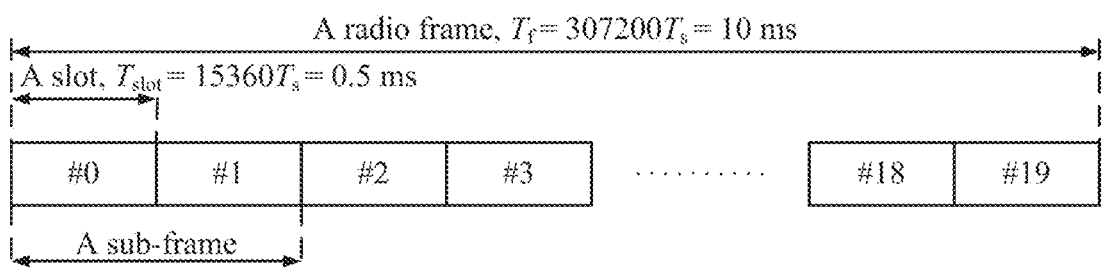
FIG. 1 is a schematic structural diagram of an FS1 in the prior art.
Figure 2:
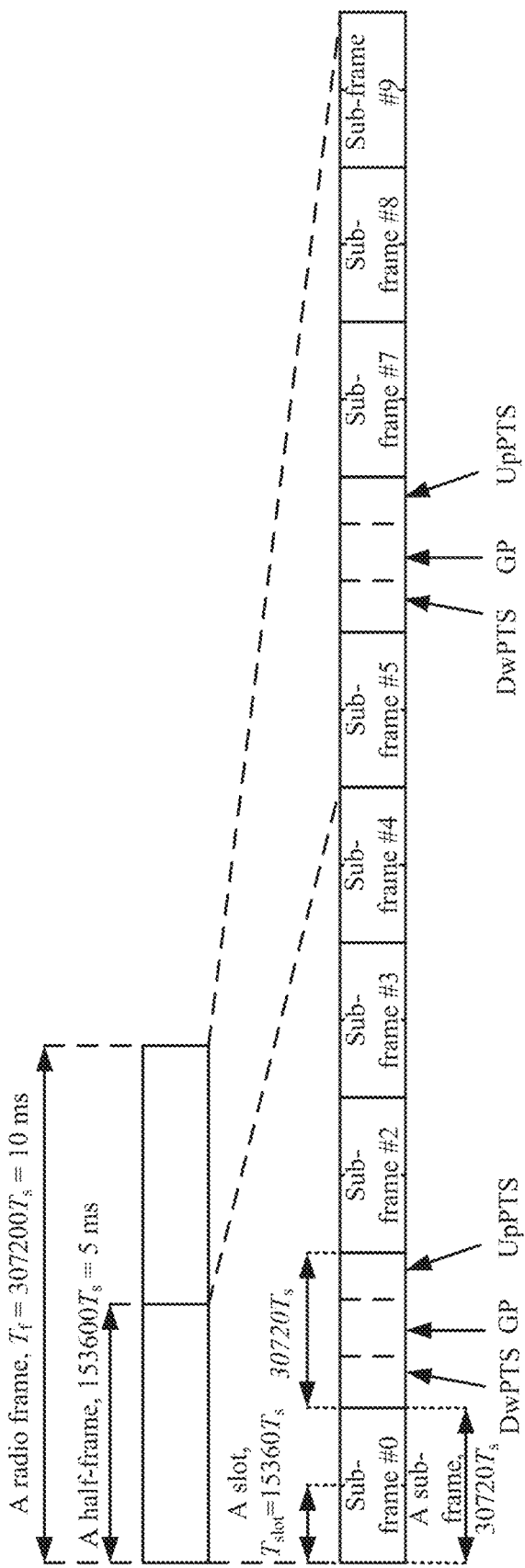
FIG. 2 is a schematic structural diagram of an FS2 in the prior art.

In order to make the objects, technical solutions, and advantages of the embodiments of the application more apparent, the application will be described below in further details with reference to the drawings, and apparently the embodiments described below are only a part but not all of the embodiments of the application. Based upon the embodiments here of the application, all the other embodiments which can occur to those skilled in the art without any inventive effort shall fall into the scope of the application.

In the embodiments of the application, as illustrated in FIG. 3A, a detailed flow of feeding back ACK/NACK at a terminal side is as follows.

In the operation 301, a terminal receives a first physical downlink control channel, where Downlink Control Information (DCI) of the first physical downlink control channel carries a first indication field for determining a time domain position of ACK/NACK feedback information.

In the embodiments of the application, a length of a TTI for the first physical downlink control channel is less than 1 ms, or a length of a TTI for a first physical downlink shared channel corresponding to the first physical downlink control channel is less than 1 ms. Alternatively the length of the TTI for the first physical downlink control channel can be greater than 1 ms, or the length of the TTI for the first physical downlink shared channel corresponding to the first physical downlink control channel can be greater than 1 ms. For example, N sub-frames are defined as a TTI, where N is a positive integer greater than 1. Here the TTI is a pre-agreed or preconfigured smallest transmission unit including A1 symbols, where A1 is a pre-agreed or preconfigured positive integer.

In an implementation, the first indication field indicates K time domain positions at which ACK/NACK feedback information can be transmitted, where K is a positive integer. In this case, the first indication field includes P bits of information, where P=$\lceil \log_2 K \rceil$, and "$\lceil \ \rceil$" represents rounding up.

In an implementation, the time domain position is an index of a sub-frame and/or an index of a symbol and/or an index of a Transmission Time Interval (TTI) and/or an index of a slot and/or an index of a mini-slot.

The time domain position can be particularly embodied as follows without any limitation thereto.

An index of a sub-frame and/or a symbol and/or a Transmission Time Interval (TTI) and/or a slot and/or a mini-slot, in one or more radio frames.

Or, an index of a sub-frame and/or a symbol and/or a Transmission Time Interval (TTI) and/or a slot and/or a mini-slot, in one or more half-frames.

Or, an index of a sub-frame and/or a symbol and/or a Transmission Time Interval (TTI) and/or a slot and/or a mini-slot, in one or more sub-frames.

Or, an index of a sub-frame and/or a symbol and/or a Transmission Time Interval (TTI) and/or a slot and/or a mini-slot, in one or more slots.

Particularly the time domain position can be defined as follows.

Any one or a part of uplink sub-frames or slots or mini-slots or symbols or TTIs in one or more radio frames or half-frames.

Or, any one or a part of sub-frames or slots or mini-slots, including a symbol for uplink transmission, in one or more radio frames or half-frames.

Or, any one or a part of sub-frames or slots or mini-slots, including such a quantity of consecutive symbols for uplink transmission that is not less than a preset number, in one or more radio frames or half-frames.

Or, any one or a part of symbols or TTIs or slots or mini-slots for uplink transmission, in one or more radio frames or half-frames.

Or, any one or a part of symbols in any one or a part of uplink sub-frames or slots or mini-slots in one or more radio frames or half-frames.

Or, any one or a part of TTIs in any one or a part of uplink sub-frames or slots or mini-slots in one or more radio frames or half-frames.

Or, any one or a part of mini-slots in any one or a part of uplink sub-frames or slots in one or more radio frames or half-frames; or A symbols in any one or a part of uplink sub-frames or slots or mini-slots in one or more radio frames or half-frames, where A is the quantity of symbols to be occupied for transmitting the ACK/NACK feedback information, and A is a positive integer.

Or, A TTIs in any one or a part of uplink sub-frames or slots or mini-slots in one or more radio frames or half-frames, where A is the quantity of TTIs to be occupied for transmitting the ACK/NACK feedback information.

Or, A mini-slots in any one or a part of uplink sub-frames or slots in one or more radio frames or half-frames, where A is the quantity of mini-slots to be occupied for transmitting the ACK/NACK feedback information.

Or, A slots in any one or a part of uplink sub-frames in one or more radio frames or half-frames, where A is the quantity of slots to be occupied for transmitting the ACK/NACK feedback information.

Or, A sub-frames in a part or all of uplink sub-frames in one or more radio frames or half-frames, where A is the quantity of sub-frames to be occupied for transmitting the ACK/NACK feedback information.

Or, any one or a part of symbols for uplink transmission in any one or a part of sub-frames or slots or mini-slots, including a symbol for uplink transmission, in one or more radio frames or half-frames.

Or, any one or a part of TTIs for uplink transmission in any one or a part of sub-frames or slots or mini-slots, including a symbol for uplink transmission, in one or more radio frames or half-frames.

Or, any one or a part of mini-slots for uplink transmission in any one or a part of sub-frames or slots, including a symbol for uplink transmission, in one or more radio frames or half-frames.

Or, A symbols in any one or a part of sub-frames or slots or mini-slots, including a symbol for uplink transmission, in one or more radio frames or half-frames, where A is the quantity of symbols to be occupied for transmitting the ACK/NACK feedback information.

Or, A TTIs in any one or a part of sub-frames or slots or mini-slots, including a symbol for uplink transmission, in one or more radio frames or half-frames, where A is the quantity of TTIs to be occupied for transmitting the ACK/NACK feedback information.

Or, A mini-slots in any one or a part of sub-frames or slots, including a symbol for uplink transmission, in one or more radio frames or half-frames, where A is the quantity of mini-slots to be occupied for transmitting the ACK/NACK feedback information.

Or, A slots in any one or a part of sub-frames, including a symbol for uplink transmission, in one or more radio frames or half-frames, where A is the quantity of slots to be occupied for transmitting the ACK/NACK feedback information.

Or, A sub-frames in a part or all of uplink sub-frames, including a symbol for uplink transmission, in one or more radio frames or half-frames, where A is the quantity of sub-frames to be occupied for transmitting the ACK/NACK feedback information.

Or, Any one or a part of symbols for uplink transmission in any one or a part of sub-frames or slots or mini-slots, including such a quantity of consecutive symbols for uplink transmission that is not less than a preset number, in one or more radio frames or half-frames.

Or, any one or a part of TTIs for uplink transmission in any one or a part of sub-frames or slots or mini-slots, including such a quantity of consecutive symbols for uplink transmission that is not less than a preset number, in one or more radio frames or half-frames.

Or, any one or a part of mini-slots for uplink transmission in any one or a part of sub-frames or slots, including such a quantity of consecutive symbols for uplink transmission that is not less than a preset number, in one or more radio frames or half-frames.

Or, A symbols in a part or all of sub-frames or slots or mini-slots, including such a quantity of consecutive symbols for uplink transmission that is not less than a preset number, in one or more radio frames or half-frames, where A is the quantity of symbols to be occupied for transmitting the ACK/NACK feedback information.

Or, A TTIs in a part or all of sub-frames or slots or mini-slots, including such a quantity of consecutive symbols for uplink transmission that is not less than a preset number, in one or more radio frames or half-frames, where A is the quantity of TTIs to be occupied for transmitting the ACK/NACK feedback information.

Or, A mini-slots in a part or all of sub-frames or slots, including such a quantity of consecutive symbols for uplink transmission that is not less than a preset number, in one or more radio frames or half-frames, where A is the quantity of mini-slots to be occupied for transmitting the ACK/NACK feedback information.

Or, A slots in a part or all of sub-frames, including such a quantity of consecutive symbols for uplink transmission that is not less than a preset number, in one or more radio frames or half-frames, where A is the quantity of slots to be occupied for transmitting the ACK/NACK feedback information.

Or, A sub-frames in a part or all of sub-frames, including such a quantity of consecutive symbols for uplink transmission that is not less than a preset number, in one or more radio frames or half-frames, where A is the quantity of sub-frames to be occupied for transmitting the ACK/NACK feedback information.

Here a part of the sub-frame(s) or the uplink sub-frame(s) satisfying the condition may be odd uplink sub-frame(s) or even uplink sub-frame(s) or the first part of uplink sub-frames or the last part of uplink sub-frames or a specified part of uplink sub-frames, e.g., the sub-frame 2 and/or the sub-frame 7, etc.; and may or may not include an UpPTS in the TDD mode.

Where the A symbols are first A consecutive symbols in the sub-frame(s), or last A consecutive symbols in the sub-frame(s), or A consecutive symbols at specified positions in the sub-frame(s).

Or, the A TTIs are first A consecutive TTIs in the sub-frame(s), or last A consecutive TTIs in the sub-frame(s), or A consecutive TTIs at specified positions in the sub-frame(s).

Or, the A mini-slots are first A consecutive mini-slots in the sub-frame(s), or last A consecutive mini-slots in the sub-frame(s), or A consecutive mini-slots at specified positions in the sub-frame(s).

Or, the A slots are first A consecutive slots in the sub-frame(s) (which includes one or more sub-frames), or last A consecutive slots in the sub-frame(s), or A consecutive slots at specified positions in the sub-frame(s).

Or, the A sub-frames are first A consecutive sub-frames in a radio frame or half-frame, or last A consecutive sub-frames in a radio frame or half-frame, or A consecutive sub-frames at specified positions in a radio frame or half-frame.

In an implementation, a mini-slot is a predefined or preconfigured element including Z symbols, e.g., an element including one or two symbols; or of course, can alternatively be an element including another number of symbols.

In the operation 302, the terminal determines a time domain position of ACK/NACK feedback information of the first physical downlink control channel or the first physical downlink shared channel corresponding to the first physical downlink control channel according to the first indication field, and transmits the ACK/NACK feedback information at the time domain position of the ACK/NACK feedback information.

In an implementation, the first indication field indicates a position of the first symbol to be occupied for transmitting the ACK/NACK feedback information, and the ACK/NACK feedback information occupies A consecutive uplink symbols starting with the first symbol, where A is a positive integer, or the first indication field indicates a position of the first TTI to be occupied for transmitting the ACK/NACK feedback information, and the ACK/NACK feedback information occupies A consecutive uplink TTIs starting with the first TTI.

Or, the first indication field indicates a position of the first slot to be occupied for transmitting the ACK/NACK feedback information, and the ACK/NACK feedback information occupies A consecutive slots starting with the first slot.

Or, the first indication field indicates a position of the first mini-slot to be occupied for transmitting the ACK/NACK feedback information, and the ACK/NACK feedback information occupies A consecutive mini-slots starting with the first mini-slot.

Or, the first indication field indicates a position of the first sub-frame to be occupied for transmitting the ACK/NACK feedback information, and the ACK/NACK feedback information occupies A consecutive sub-frames starting with the first sub-frame.

Or, the first indication field indicates a position of a radio frame or a half-frame or a sub-frame or a slot or a TTI or a mini-slot or a symbol including the time domain position for transmitting the ACK/NACK feedback information.

Particularly the terminal determines the position of the radio frame or the half-frame or the sub-frame or the slot or the mini-slot or the symbol including the time domain position for transmitting the ACK/NACK feedback information in the following two particular implementations without being limited thereto.

In a first implementation, the terminal determines the position of the radio frame or the half-frame or the sub-frame or the slot or the mini-slot or the symbol, including the time domain position of the ACK/NACK feedback information indicated by the first indication field, according to a first TTI length and/or a second TTI length, where the first TTI length is a TTI length of the first physical downlink control channel and/or the first physical downlink shared channel corresponding to the first physical downlink control channel, and the second TI length is a preconfigured or pre-agreed TTI length for determining the time domain position of the ACK/NACK feedback information.

For the sake of brevity, "the first physical downlink control channel, and/or the first physical downlink shared channel corresponding to the first physical downlink control channel" will be replaced in brief with "the downlink transmission", that is, the terminal determines the time domain position of the ACK/NACK feedback information according to a processing delay of the downlink transmission, and a time domain resource in a radio frame or a half-frame or a sub-frame or a slot or a mini-slot, indicated by the first indication field. Where the processing delay particularly relates to a process of processing the downlink transmission and generating corresponding feedback information, and for example, the processing delay can be defined as k*a TTI length of the downlink transmission, or k*a preconfigured or pre-agreed TTI length for determining the time domain position of ACK/NACK, or max(a preconfigured or pre-agreed TTI length for determining the time domain position of ACK/NACK, a TTI length of the downlink transmission) *k, where max(a, b) is the larger one of a and b. Here k is a predefined or preconfigured positive integer, e.g., k=3, that is, the processing delay at this time does not include a period of time for receiving the downlink transmission; or k=4, that is, the processing delay at this time includes a period of time for receiving the downlink transmission.

By way of an example in which the processing delay does not include a period of time for receiving the downlink transmission, the time domain position of the feedback information can be determined according to the processing delay particularly in the following two schemes without being limited thereto.

In a first scheme, the time domain position is determined as following time domain resource(s).

The first time domain resource indicated by the first indication field satisfying a time length L1*k or L2*k symbols after an end time position or an end symbol position of the downlink transmission.

Or the first time domain resource indicated by the first indication field no earlier than a time length L1*k or L2*k symbols after an end time position or an end symbol position of the downlink transmission.

Or the first time domain resource indicated by the first indication field after a TTI with an index n+k, when TTIs are numbered as per the TTI length of the downlink transmission, where an index of a TTI of the downlink transmission is n.

Or the first time domain resource indicated by the first indication field spaced from an end time position or an end symbol position of the downlink transmission by not less than a time length L1*k or L2*k symbols.

Where L1 is a TTI length of the downlink transmission in a time unit, and for example, the TTI length of the downlink transmission is L1 milliseconds; and L2 is a TTI length of the downlink transmission in a symbol unit, and for example, the TTI length of the downlink transmission is L2 symbols.

In a second scheme, the time domain position is determined as following time domain resource(s).

The first time domain resource indicated by the first indication field satisfying a time length L3*k or L4*k symbols after an end time position or an end symbol position of the downlink transmission, determined according to a specific TTI length.

Or the first time domain resource indicated by the first indication field no earlier than a time length L3*k or L4*k symbols after an end time position or an end symbol position of the downlink transmission, determined according to a specific TTI length.

Or the first time domain resource indicated by the first indication field after a TTI with an index n+k, when TTIs are numbered as per a specific TTI length, where an index of a TTI of the downlink transmission is n.

Or the first time domain resource indicated by the first indication field spaced from an end time position or an end symbol position of the downlink transmission, determined according to a specific TTI length, by not less than a time length L3*k or L4*k symbols.

Where L3 is a specific TTI length in a time unit, and for example, the specific TTI length is L3 milliseconds; L4 is a specific TTI length in a symbol unit, and for example, the specific TTI length is L4 symbols; and the specific TTI length is a preconfigured or pre-agreed TTI length for determining the time domain position of ACK/NACK, or max (a preconfigured or pre-agreed TTI length for determining the time domain position of ACK/NACK, the TTI length of the downlink transmission).

When the processing delay includes a period of time for receiving the downlink transmission, the time domain position of the feedback information can be determined according to the processing delay particularly in substantially the same way as the process above except that a delay with a length of the processing delay is made backward with reference to a start position of the downlink transmission, and the time domain position is determined as the first time domain resource indicated by the first indication field satisfying the delay.

With the process above, it can be determined whether the first time domain resource indicated by the first indication field satisfying the processing delay lies in a radio frame or a half-frame or a sub-frame or a slot or a mini-slot or a TTI or a symbol including the downlink transmission, or lies in a succeeding radio frame or one or two succeeding half-frames or X1 succeeding sub-frames or X2 succeeding slots or X3 succeeding mini-slots or X4 succeeding TTIs or X5 succeeding symbols to a radio frame or a half-frame or a sub-frame or a slot or a mini-slot or a TTI or a symbol including the downlink transmission. For example, if a time domain resource indicated by the first indication field in a radio frame including the downlink transmission satisfies the processing delay, then it will be determined that the time domain resource indicated by the first indication field lies in the current radio frame; and if the time domain resource indicated by the first indication field in a radio frame including the downlink transmission does not satisfy the processing delay, or if a time domain resource indicated by the first indication field in a succeeding radio frame to a radio frame including the downlink transmission is the most recent time domain position satisfying the processing delay, then it will be determined that the time domain resource indicated by the first indication field lies in the succeeding radio frame to the current radio frame. This will apply to determination of the position of a half-frame/sub-frame/slot/ mini-slot/TTI/symbol, so a repeated description thereof will be omitted here.

In a second implementation, the terminal determines a position of a radio frame or a half-frame or a sub-frame including the time domain position of the ACK/NACK feedback information indicated by the first indication field, according to a magnitude or sequential order between an index of a sub-frame in which the first physical downlink control channel is transmitted, and an index of a sub-frame including the time domain position of the ACK/NACK feedback information indicated by the first indication field.

Or, the terminal determines a position of a radio frame or a half-frame or a sub-frame or a slot including the time domain position of the ACK/NACK feedback information indicated by the first indication field, according to a magnitude or sequential order between an index of a slot in which the first physical downlink control channel is transmitted, and an index of a slot including the time domain position of the ACK/NACK feedback information indicated by the first indication field.

Or, the terminal determines a position of a radio frame or a half-frame or a sub-frame or a slot or a TTI including the time domain position of the ACK/NACK feedback information indicated by the first indication field, according to a magnitude or sequential order between an index of a TTI in which the first physical downlink control channel is transmitted, and an index of a TTI including the time domain position of the ACK/NACK feedback information indicated by the first indication field.

Or, the terminal determines a position of a radio frame or a half-frame or a sub-frame or a slot or a mini-slot including the time domain position of the ACK/NACK feedback information indicated by the first indication field, according to a magnitude or sequential order between an index of a mini-slot in which the first physical downlink control channel is transmitted, and an index of a mini-slot including the time domain position of the ACK/NACK feedback information indicated by the first indication field.

Or, the terminal determines a position of a radio frame or a half-frame or a sub-frame or a slot or a mini-slot or a symbol including the time domain position of the ACK/NACK feedback information indicated by the first indication field, according to a magnitude or sequential order between an index of a symbol in which the first physical downlink control channel is transmitted, and an index of a symbol including the time domain position of the ACK/NACK feedback information indicated by the first indication field.

Stated otherwise, the time domain position of the ACK/NACK feedback information indicated by the first indication field is no earlier than a time domain position at which the first physical downlink control channel or the first physical downlink shared channel corresponding to the first physical downlink control channel is transmitted. For example, if the first physical downlink control channel or the first physical downlink shared channel corresponding to the first physical downlink control channel is transmitted in the sub-frame #5, and the time domain position of the ACK/NACK feedback information indicated by the first indication field lies in the sub-frame #0, then since the sub-frame #0 is earlier than the sub-frame #5 in a radio frame in which the first physical downlink control channel or the first physical downlink shared channel corresponding to the first physical downlink control channel is transmitted, so it will be determined that the time domain position of the ACK/NACK feedback information indicated by the first indication field lie in the sub-frame #0 in a succeeding radio frame; and this will apply to determination of the position of a half-frame/'sub-frame'slot/mini-slot/TTI/symbol, so a repeated description thereof will be omitted here.

In the embodiments of the application, the time domain position of the ACK/NACK feedback information is one or a combination of the following instances.

The radio frame including the time domain position of the ACK/NACK feedback information is; a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, where n1 is a positive integer.

The half-frame including the time domain position of the ACK/NACK feedback information is; a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, where n2 is a positive integer.

The sub-frame including the time domain position of the ACK/NACK feedback information is: a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, where n3 is a positive integer.

The slot including the time domain position of the ACK/NACK feedback information is: a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, where n4 is a positive integer.

The mini-slot including the time domain position of the ACK/NACK feedback information is: a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, where n5 is a positive integer.

The TTI including the time domain position of the ACK/NACK feedback information is: a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, where n6 is a positive integer.

The symbol including the time domain position of the ACK/NACK feedback information is: a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, where n7 is a positive integer.

In an implementation, if the terminal determines the same time domain position of the ACK/NACK feedback information respectively according to the first indication fields of a plurality of the first physical downlink channels, then the terminal will concatenate ACK/NACK feedback information, of respective first physical downlink channels among the plurality of the first physical downlink channels or of first physical downlink shared channels corresponding to the respective first physical downlink channels, according to DAI indication fields (second indication fields hereinafter) in the DCI of the plurality of the first physical downlink channels, and transmit a concatenated ACK/NACK feedback information at the same time domain position of the ACK/NACK feedback information. Here a DAI is a counter indicating the total number of instances of downlink transmission, for which ACK/NACK is to be fed back at the same time domain position, scheduled over the same carrier until the current downlink transmission; or indicating the total number of instances of downlink transmission, for which ACK/NACK is to be fed back at the same time domain position, scheduled over a plurality of carriers and/or in a plurality of TTIs until the current downlink transmission. With the continuity of the value of the DAI, it can be determined whether there is intermediate downlink transmission lost, and for example, the DAI indicates 1 when the first downlink transmission is received, and 3 when the second downlink transmission is received, which indicates that there is downlink transmission lost between the received first and second downlink transmission, so NACK can be generated as feedback information for this lost downlink transmission, and the DAI value thereof can be determined as 2, ACK/NACK of the three downlink transmission can be sorted and concatenated together according to the DAI values, and for example, can be sorted and concatenated in an ascending order of the DAI values. Furthermore the total number indicated by the DAI may not involve any first physical downlink shared channel of Semi-Persistent Scheduling (SPS), or the total number may only accumulate the quantity of first physical downlink control channels instructing release of a downlink SPS resource, and first physical downlink shared channels with corresponding first physical downlink control channels.

For example, the second indication field is 2 bits of information, and values indicated by the second indication field are as depicted in Table 3; and if the quantity of instances of downlink transmission for which ACK/NACK feedback information is to be transmitted at the same uplink position is not greater than four, then a one-to-one mapping pattern may be applied; and if that quantity of instances of downlink transmission is greater than four, then a Mod-4 multi-to-one mapping pattern may be applied, and for example, "00" may indicate one or five or nine instances of downlink transmission. It shall be noted that the second indication field has only been described as 2 bits of information by way of an example, but reference can be made to the mapping pattern in Table 3 for the second indication field including another quantity of bits of information, so a repeated description thereof will be omitted here.

TABLE 3

Values indicated by the second indication field.

| The state of the second indication field | The value indicated by the second indication field | The quantity of instances of downlink transmission |
| --- | --- | --- |
| 00 | 1 | 1 or 5 or 9 |
| 01 | 2 | 2 or 6 |
| 10 | 3 | 3 or 7 |
| 11 | 4 | 4 or 8 |

In the embodiments of the application, if the terminal determines that the difference in time between the time domain position and the first physical downlink control channel is less than a processing delay, or that the difference in time between the time domain position and the first physical downlink shared channel corresponding to the first physical downlink control channel is less than a processing delay, then the terminal will not feed back any ACK/NACK feedback information corresponding to the first physical downlink control channel, or will feed back NACK at the time domain position, otherwise, the terminal will feed back the ACK/NACK feedback information corresponding to the first physical downlink control channel. The processing delay is defined as described above, so a repeated description thereof will be omitted here.

In an implementation, if there is a first physical downlink shared channel corresponding to the first physical downlink control channel (which is a dynamically scheduled first physical downlink shared channel, or an SPS first physical downlink shared channel; and if it is the SPS first physical downlink shared channel, then the first physical downlink control channel is used to activate the transmission of the SPS first physical downlink shared channel), then the ACK/NACK feedback information will be ACK/NACK feedback information of the first physical downlink shared channel; and/or if the first physical downlink control channel instructs a release of a downlink Semi-Persistent Scheduling (SPS) resource, then the ACK/NACK feedback information will be ACK/NACK feedback information of the first physical downlink control channel.

It shall be noted that if the first physical downlink control channel instructs activation of a downlink Semi-Persistent Scheduling (SPS) resource, then a time domain position of ACK/NACK feedback information, to be transmitted each time, of the SPS first physical downlink shared channel activated by the first physical downlink control channel will be determined according to the first indication field carried in the DCI of the first physical downlink control channel.

Particularly the terminal feeds back the ACK/NACK feedback information corresponding to the first physical downlink control channel at the time domain position over a PUCCH or a Physical Uplink Shared Channel (PUSCH). The PUCCH can be structured in the same way as the mapping and spreading patterns of the PUCCH format 4/5 except for a different time domain transmission length and/or a frequency domain resource size; or of course, the PUCCH can alternatively be structured in the same way as another PUCCH format.

Based upon the same inventive concept, as illustrated in FIG. 3B, a detailed flow of a method for obtaining ACK/NACK feedback information at a base station side according to the embodiments of the application is as follows.

In the operation 401, a base station transmits a first physical downlink control channel to a terminal, where Downlink Control Information (DCI) of the first physical downlink control channel carries a first indication field for determining a time domain position of ACK/NACK feedback information.

Here reference can be made to the description of the operation 301 to the operation 302 for how the first indication field indicates the time domain position of the ACK/NACK feedback information, so a repeated description thereof will be omitted here.

In the operation 402, the base station receives ACK/NACK feedback information, fed back by the terminal, of the first physical downlink control channel or a first physical downlink shared channel corresponding to the first physical downlink control channel at the time domain position, of the ACK/NACK feedback information, determined according to the first indication field.

The base station determines a time domain position corresponding to ACK/NACK feedback information of each downlink transmission, and a sorting order of the ACK/NACK feedback information, in the same way as the terminal side to thereby be consistent with the operations of the terminal to parse correctly the ACK/NACK feedback information transmitted by the terminal, particularly as described in the operation 301 and the operation 302, so a repeated description thereof will be omitted here.

A process of feeding back ACK/NACK according to the embodiments of the application will be exemplified below in particular embodiments thereof.

The first particular embodiment: in this particular embodiment, an FDD carrier with a normal Cyclic Prefix (CP) will be described by way of an example.

In this particular embodiment, it is assumed that ACK/NACK feedback information can be transmitted in the last symbol in each uplink sub-frame of a radio frame, and then there will be ten time domain positions of ACK/NACK feedback information in a radio frame. A first indication field in DCI to indicate a time domain position of ACK/NACK feedback information occupies four bits, where a correspondence relationship between a first indication field and an indicated time domain position of ACK/NACK feedback information is as depicted in Table 4.

TABLE 4

A correspondence relationship between a first indication field in DCI and an indicated time domain position of ACK/NACK feedback information.

| First indication field | Value of the first indication field or time domain position index | Time domain position of ACK/NACK feedback information |
|---|---|---|
| 0000 | 1 | The last symbol in the sub-frame #0 |
| 0001 | 2 | The last symbol in the sub-frame #1 |
| 0010 | 3 | The last symbol in the sub-frame #2 |
| 0011 | 4 | The last symbol in the sub-frame #3 |
| 0100 | 5 | The last symbol in the sub-frame #4 |
| 0101 | 6 | The last symbol in the sub-frame #5 |
| 0110 | 7 | The last symbol in the sub-frame #6 |
| 0111 | 8 | The last symbol in the sub-frame #7 |
| 1000 | 9 | The last symbol in the sub-frame #8 |
| 1001 | 10 | The last symbol in the sub-frame #9 |
| Reserved | Reserved | Reserved |

Figure 4:
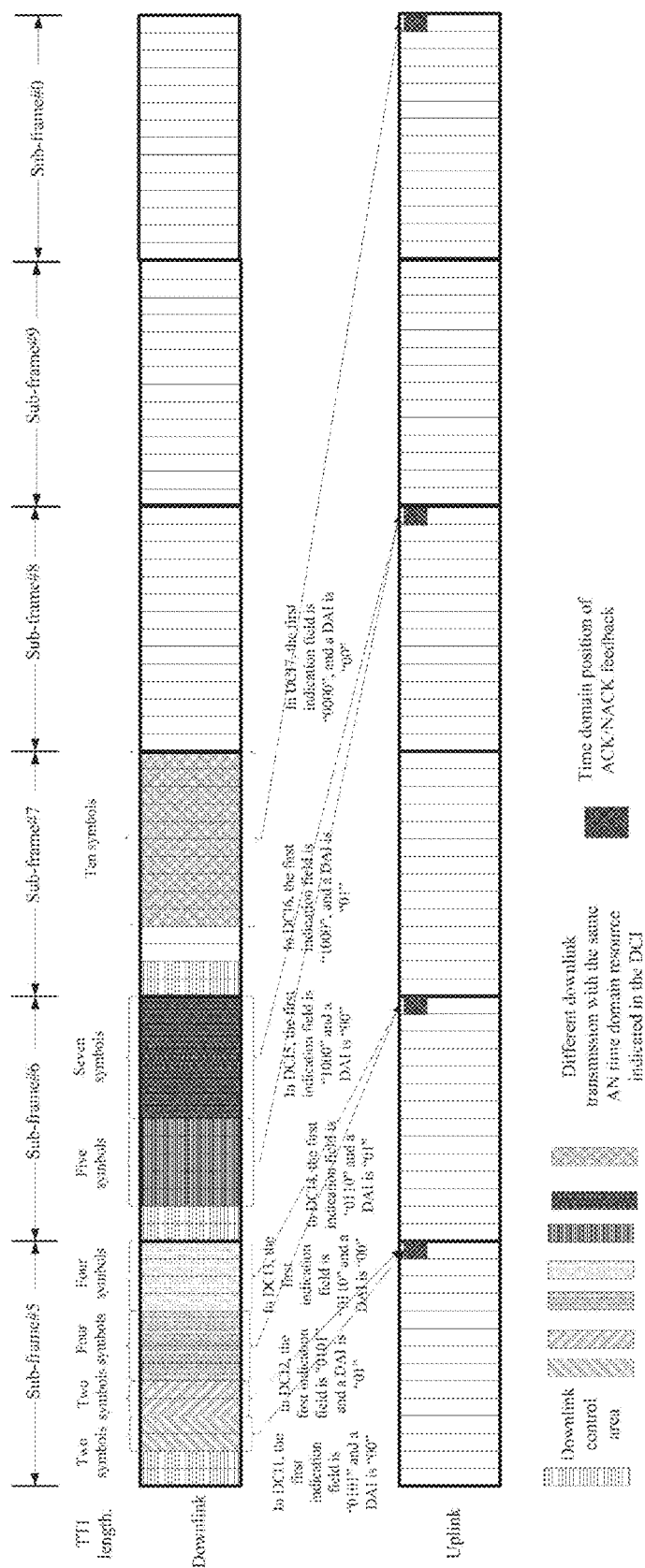
FIG. 4 is a schematic diagram of indicating, in DCI, time domain positions for transmitting ACK/NACK feedback information corresponding to downlink transmission by a terminal over different resources in different sub-frames according to a first particular embodiment of the application.

In this particular embodiment, FIG. 4 illustrates a schematic diagram of indicating, in DCI, time domain positions for transmitting ACK/NACK feedback information corresponding to downlink transmission by a terminal over different resources in different sub-frames. The time domain positions are particularly indicated as follows.

In the first instance, the first indication field in DCI1 of a physical downlink control channel corresponding to the first downlink transmission in the sub-frame #5 is "0101", the first indication field in DCI2 of a physical downlink control channel corresponding to the second downlink transmission in the sub-frame #5 is also "0101", the sub-frame number indicated by the first indication field is not less than the index of the sub-frame in which the DCI is transmitted, and the last symbol in the sub-frame indicated by the first indication field of the current radio frame (i.e., the radio frame in which the DCI is transmitted, and the same will apply hereinafter) satisfies the feedback delay, so it is determined that ACK/NACK feedback information of the first and second downlink transmission is to be transmitted in the last symbol in the sub-frame #5 of the current radio frame. The ACK/NACK feedback information corresponding to the first and second downlink transmission is sorted according to Downlink Assignment Index (DAI) indication fields in the DCI1 and the DCI2, and a resulting sorted ACK/NACK sequence is transmitted at the determined time domain position.

In the second instance, the first indication field in DCI3 of a physical downlink control channel corresponding to the third downlink transmission in the sub-frame #5 is "0110", the first indication field in DCI4 of a physical downlink control channel corresponding to the fourth downlink transmission in the sub-frame #5 is also "0110", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK feedback information of the third and fourth downlink transmission is to be transmitted in the last symbol in the sub-frame #6 of the current radio frame. The ACK/NACK feedback information corresponding to the third and fourth downlink transmission is sorted according to DAI indication fields in the DCI3 and the DCI3, and a resulting sorted ACK/NACK sequence is transmitted at the determined time domain position.

In the third instance, the first indication field in DCI5 of a physical downlink control channel corresponding to the fifth downlink transmission in the sub-frame #6 is "1000", the first indication field in DCI6 of a physical downlink control channel corresponding to the sixth downlink transmission in the sub-frame #6 is also "1000", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK feedback information of the fifth and sixth downlink transmission is to be transmitted in the last symbol in the sub-frame #8 of the current radio frame. The ACK/NACK feedback information corresponding to the fifth and sixth downlink transmission is sorted according to DAI indication fields in the DCI5 and the DCI6, and a resulting sorted ACK/NACK sequence is transmitted at the determined time domain position.

In the fourth instance, the first indication field in DCI7 of a physical downlink control channel corresponding to the seventh downlink transmission in the sub-frame #7 is "0000", and the sub-frame number indicated by the first indication field is not less than the index of the sub-frame in which the DCI is transmitted, so it is determined that ACK/NACK feedback information of the downlink transmission is to be transmitted in the last symbol in the sub-frame #0 of a succeeding radio frame (i.e., a succeeding radio frame to the radio frame in which the DCI is transmitted, and the same will apply hereinafter).

The base station determines a time domain position corresponding to ACK/NACK feedback information of each downlink transmission, and a sorting order of the ACK/NACK feedback information, in the same way as the first to fourth instances above to thereby be consistent with the operations of the terminal to parse correctly the ACK/NACK feedback information transmitted by the terminal.

The second particular embodiment: in this particular embodiment, an FDD carrier with a normal CP will be described by way of an example.

In this particular embodiment, if ACK/NACK feedback information can be transmitted in the last symbol in each uplink sub-frame with an even number of a radio frame, then there will be five time domain positions of ACK/NACK feedback information in a radio frame. A first indication field in DCI to indicate a time domain position of ACK/NACK feedback information occupies three bits, where a correspondence relationship between a first indication field and an indicated time domain position of ACK/NACK feedback information is as depicted in Table 5.

TABLE 5

A correspondence relationship between a first indication field in DCI and an indicated time domain position of ACK/NACK feedback information.

| First indication field | Value of the first indication field or time domain position index | Time domain position of ACK/NACK feedback information |
| --- | --- | --- |
| 000 | 1 | The last symbol in the sub-frame #0 |
| 001 | 2 | The last symbol in the sub-frame #2 |
| 010 | 3 | The last symbol in the sub-frame #4 |
| 011 | 4 | The last symbol in the sub-frame #6 |
| 100 | 5 | The last symbol in the sub-frame #8 |
| 101 | Reserved | Reserved |
| 110 | Reserved | Reserved |
| 111 | Reserved | Reserved |

Figure 5:
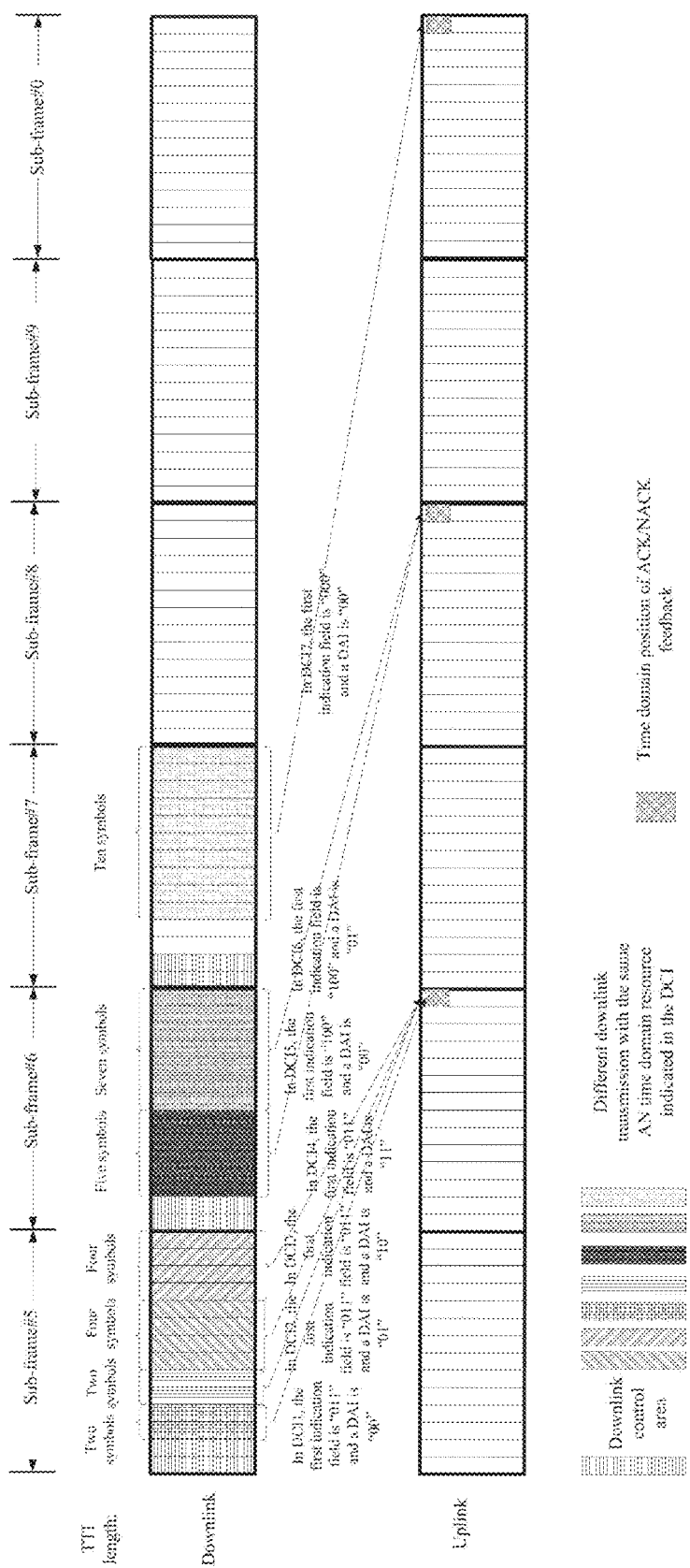
FIG. 5 is a schematic diagram of indicating, in DCI, time domain positions for transmitting ACK/NACK feedback information corresponding to downlink transmission by a terminal over different resources in different sub-frames according to a second particular embodiment of the application.

In this particular embodiment, FIG. 5 illustrates a schematic diagram of indicating, in DCI, time domain positions for transmitting ACK/NACK feedback information corresponding to downlink transmission by a terminal over different resources in different sub-frames. The time domain positions are particularly indicated as follows.

In the first instance, all the first indication fields in DCI1 of a physical downlink control channel corresponding to the first downlink transmission, DCI2 of a physical downlink control channel corresponding to the second downlink transmission, DCI3 of a physical downlink control channel corresponding to the third downlink transmission, and DCI4 of a physical downlink control channel corresponding to the fourth downlink transmission in the sub-frame #5 are "011", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK feedback information of the first to fourth downlink transmission is to be transmitted in the last symbol in the sub-frame #6 of the current radio frame. The ACK/NACK feedback information corresponding to the first to fourth downlink transmission is sorted according to DAI indication fields in the DCI1, the DCI2, the DCI3 and the DCI4, and a resulting sorted ACK/NACK sequence is transmitted at the determined time domain position.

In the second instance, both of the first indication fields in DCI5 of a physical downlink control channel corresponding to the fifth downlink transmission, and DCI6 of a physical downlink control channel corresponding to the sixth downlink transmission in the sub-frame #6 are "100", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK feedback information of the two downlink transmission is to be transmitted in the last symbol in the sub-frame #8 of the current radio frame. The ACK/NACK feedback information corresponding to the fifth and sixth downlink transmission is sorted according to DAI indication fields in the DCI5 and the DCI6, and a resulting sorted ACK/NACK sequence is transmitted at the determined time domain position.

In the third instance, the first indication field in DCI7 of a physical downlink control channel corresponding to the seventh downlink transmission in the sub-frame #7 is "000", and the sub-frame number indicated by the first indication field is not less than the index of the sub-frame in which the DCI is transmitted, so it is determined that ACK/NACK feedback information of the downlink transmission is to be transmitted in the last symbol in the sub-frame #0 of a succeeding radio frame.

The base station determines a time domain position corresponding to ACK/NACK feedback information of each downlink transmission, and a sorting order of the ACK/NACK feedback information, in the same way as the first to third instances above to thereby be consistent with the operations of the terminal to parse correctly the ACK/NACK feedback information transmitted by the terminal.

It shall be noted that the second particular embodiment can also be applicable to a sub-frame/symbol/TTI defined for transmitting ACK/NACK, so a repeated description thereof will be omitted here.

Furthermore the first indication field in the first particular embodiment and the second particular embodiment can be modified to only indicate a time domain position of ACK/NACK feedback information in half a radio frame. For example, in the second particular embodiment, the first indication field in the DCI can be further reduced to two bits indicating a correspondence relationship as depicted in Table 6.

TABLE 6

A correspondence relationship between a first indication field in DCI and an indicated time domain position of ACK/NACK feedback information.

| First indication field | Value of the first indication field or time domain position index | Time domain position of ACK/NACK feedback information |
| --- | --- | --- |
| 00 | 1 | In the sub-frame #0 (the first half of a frame) or 6 (the second half of the frame) |
| 01 | 2 | In the sub-frame #2 (the first half of a frame) or 8 (the second half of the frame) |
| 10 | 3 | The last symbol in the sub-frame #4 |
| 11 | Reserved | Reserved |

Figure 6:
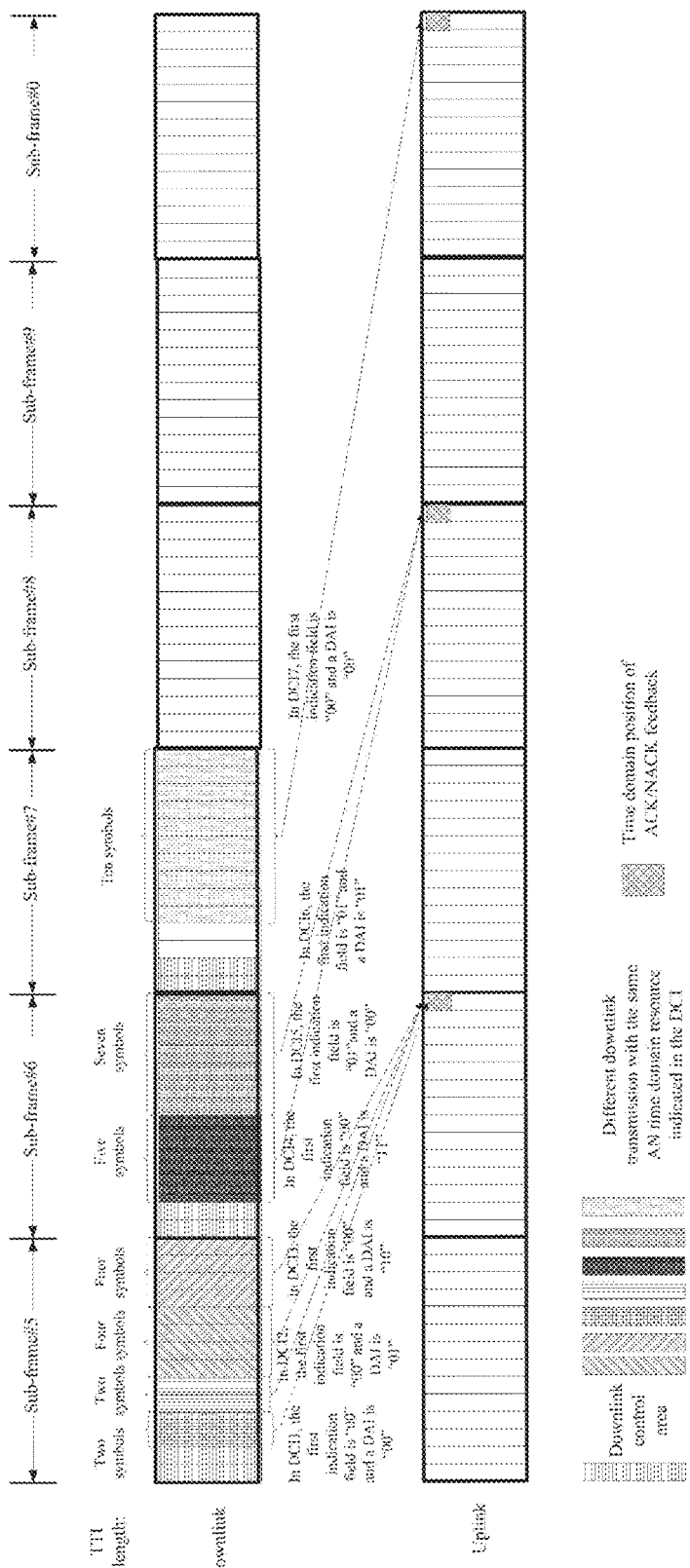
FIG. 6 is another schematic diagram of indicating, in DCI, time domain positions for transmitting ACK/NACK feedback information corresponding to downlink transmission by a terminal over different resources in different sub-frames according to the second particular embodiment of the application.

As illustrated in FIG. 6, it can be determined particularly as follows whether the half-frame corresponding to the indicated time domain position of ACK/NACK is the first half or the second half of the current frame, or the first half or the second half of a succeeding frame, according to the relationship between a sub-frame number and a processing delay as described above.

In the fourth instance, all the first indication fields in DCI1 of a physical downlink control channel corresponding to the first downlink transmission, DCI2 of a physical downlink control channel corresponding to the second downlink transmission, DCI3 of a physical downlink control channel corresponding to the third downlink transmission, and DCI4 of a physical downlink control channel corresponding to the fourth downlink transmission in the sub-frame #5 are "00", which corresponds to the last symbol in the sub-frame #0 or #6, and since the index of the sub-frame #6 is not less than the index of the sub-frame in which the DCI is transmitted, and the last symbol in the sub-frame indicated by the first indication field of the current radio frame satisfies the feedback delay, it is determined that ACK/NACK of the four downlink transmission is to be transmitted in the last symbol in the sub-frame #6 of the current radio frame; and the ACK/NACK feedback information corresponding to the first to fourth downlink transmission is sorted according to DAI indication fields in the DCI1, the DCI2, the DCI3 and the DCI4, and a resulting sorted ACK/NACK sequence is transmitted at the determined time domain position.

In the fifth instance, both of the first indication fields in DCI5 of a physical downlink control channel corresponding to the fifth downlink transmission, and DCI6 of a physical downlink control channel corresponding to the sixth downlink transmission in the sub-frame #6 are "01", which corresponds to the last symbol in the sub-frame #2 or #8, and since the index of the sub-frame #8 is not less than the index of the sub-frame in which the DCI is transmitted, and the last symbol in the sub-frame indicated by the first indication field of the current radio frame satisfies the feedback delay, it is determined that ACK/NACK of the two downlink transmission is to be transmitted in the last symbol in the sub-frame #8 of the current radio frame; and the ACK/NACK corresponding to the fifth and sixth downlink transmission is sorted according to DAI indication fields in the DCI5 and the DCI6, and a resulting sorted ACK/NACK sequence is transmitted at the determined time domain position.

In the sixth instance, the first indication field in DCI7 of a physical downlink control channel corresponding to the seventh downlink transmission in the sub-frame #7 is "00", which corresponds to the last symbol in the sub-frame #0 or #6, and since both of the indexs of the sub-frames #0 and #6 is not less than the index of the sub-frame in which the DCI is transmitted, it is determined that ACK/NACK feedback information thereof is to be transmitted in a succeeding radio frame, and since the last symbol in the sub-frame #0 of the succeeding radio frame is the most recent position satisfying the feedback delay, it is determined that the ACK/NACK of the downlink transmission is to be transmitted in the last symbol in the sub-frame #0 of the succeeding radio frame.

The base station determines a time domain position corresponding to ACK/NACK feedback information of each downlink transmission, and a sorting order of the ACK/NACK feedback information, in the same way as the fourth to sixth instances above to thereby be consistent with the operations of the terminal to parse correctly the ACK/NACK feedback information transmitted by the terminal.

The third particular embodiment: in this particular embodiment, a TDD carrier with a normal CP and the TDD uplink-downlink configuration 1 will be described by way of an example. For example, a TDD special sub-frame is configured in the configuration 7 (that is, a DwPTS includes ten symbols, a GP includes two symbols, and an UpPTS includes two symbols), for example, and if ACK/NACK feedback information can be transmitted in the last symbol in each uplink sub-frame (including an UpPTS) of a radio frame, then there will be six time domain positions of ACK/NACK feedback information in a radio frame, i.e., the sub-frames #1, 2, 3, 6, 7, and 8. A first indication field in DCI to indicate a time domain position of ACK/NACK feedback information occupies three bits, where a correspondence relationship between a first indication field and an indicated time domain position of ACK/NACK feedback information is as depicted in Table 7.

TABLE 7

A correspondence relationship between a first indication field in DCI and an indicated time domain position of ACK/NACK feedback information.

| State of the first indication field | Value of the first indication field or time domain position index | Time domain position of ACK/NACK feedback information |
|---|---|---|
| 000 | 1 | The last symbol in the sub-frame #1 |
| 001 | 2 | The last symbol in the sub-frame #2 |
| 010 | 3 | The last symbol in the sub-frame #3 |
| 011 | 4 | The last symbol in the sub-frame #6 |
| 100 | 5 | The last symbol in the sub-frame #7 |
| 101 | 6 | The last symbol in the sub-frame #8 |
| 110 | Reserved | Reserved |
| 111 | Reserved | Reserved |

Figure 7:
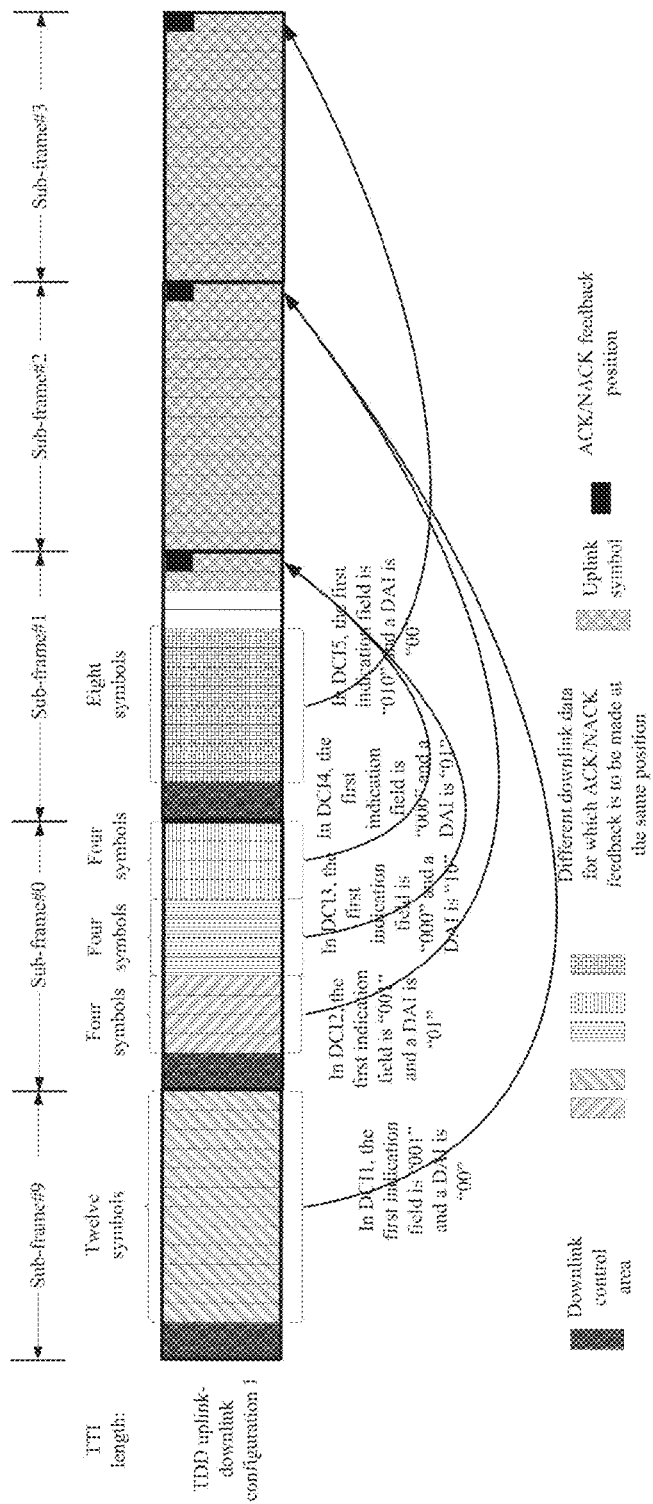
FIG. 7 is a schematic diagram of indicating, in DCI, time domain positions for transmitting ACK/NACK feedback information corresponding to downlink transmission by a terminal over different resources in different sub-frames according to a third particular embodiment of the application.

In this particular embodiment, FIG. 7 illustrates a schematic diagram of indicating, in DCI, time domain positions for transmitting ACK/NACK feedback information corresponding to downlink transmission by a terminal over different resources in different sub-frames. The time domain positions are particularly indicated as follows.

In the first instance, the first indication field in DCI1 of a physical downlink control channel corresponding to the first downlink transmission in the sub-frame #9 is "011", and the sub-frame number indicated by the first indication field is less than the index of the sub-frame in which the DCI is transmitted, so it is determined that ACK/NACK of the downlink transmission is to be transmitted in the last symbol in the sub-frame #2 of a succeeding radio frame. The first indication field in DCI2 of a physical downlink control channel corresponding to the second downlink transmission in the sub-frame #0 is also "011", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK of the downlink transmission is to be transmitted in the last symbol in the sub-frame #2 of the current radio frame, that is, at the same position as the ACK/NACK of the first downlink transmission. The ACK/NACK feedback information corresponding to the first and second downlink transmission is sorted according to DAI indication fields in the DCI1 and the DCI2, and a resulting sorted ACK/NACK sequence is transmitted at the determined time domain position.

In the second instance, both of the first indication fields in DCI3 of a physical downlink control channel corresponding to the third downlink transmission, and DCI4 of a physical downlink control channel corresponding to the fourth downlink transmission in the sub-frame #0 are "000", the sub-frame number indicated by the first indication field is not less than the index of the sub-frame in which the DCI is transmitted, and the last symbol in the sub-frame indicated by the first indication field of the current radio frame satisfies the feedback delay, so it is determined that both the ACK/NACK of the two downlink transmission is to be transmitted in the last symbol in the sub-frame #1 of the current radio frame; and the ACK/NACK feedback information corresponding to the third and fourth downlink transmission is sorted according to DAI indication fields in the DCI3 and the DCI4, and a resulting sorted ACK/NACK sequence is transmitted at the determined time domain position.

In the third instance, the first indication field in DCI5 of a physical downlink control channel corresponding to the fifth downlink transmission in the sub-frame #1 is "010", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK of the downlink transmission is to be transmitted in the last symbol in the sub-frame #3 of the current radio frame.

The base station determines a time domain position corresponding to ACK/NACK feedback information of each downlink transmission, and a sorting order of the ACK/NACK feedback information, in the same way as the first to third instances above to thereby be consistent with the operations of the terminal to parse correctly the ACK/NACK feedback information transmitted by the terminal.

The fourth particular embodiment: in this particular embodiment, a TDD carrier with a normal CP and the TDD uplink-downlink configuration 1 will be described by way of an example. For example, a TDD special sub-frame is configured in the configuration 7 (that is, a DwPTS includes ten symbols, a GP includes two symbols, and an UpPTS includes two symbols), for example, and if ACK/NACK feedback information can only be transmitted in the last symbols in the uplink sub-frames #2 and 3 of a radio frame, then there will be four time domain positions of ACK/NACK feedback information in a radio frame, i.e., the sub-frames #2, 3, 7, and 8. A first indication field in DCI to indicate a time domain position of ACK/NACK feedback information occupies two bits, where a correspondence relationship between a first indication field and an indicated time domain position of ACK/NACK feedback information is as depicted in Table 8.

TABLE 8

A correspondence relationship between a first indication field in DCI and an indicated time domain position of ACK/NACK feedback information.

| State of the first indication field | Value of the first indication field or time domain position index | Time domain position of ACK/NACK feedback information |
| --- | --- | --- |
| 00 | 1 | The last symbol in the sub-frame #2 |
| 01 | 2 | The last symbol in the sub-frame #3 |
| 10 | 3 | The last symbol in the sub-frame #7 |
| 11 | 4 | The last symbol in the sub-frame #8 |

Figure 8:
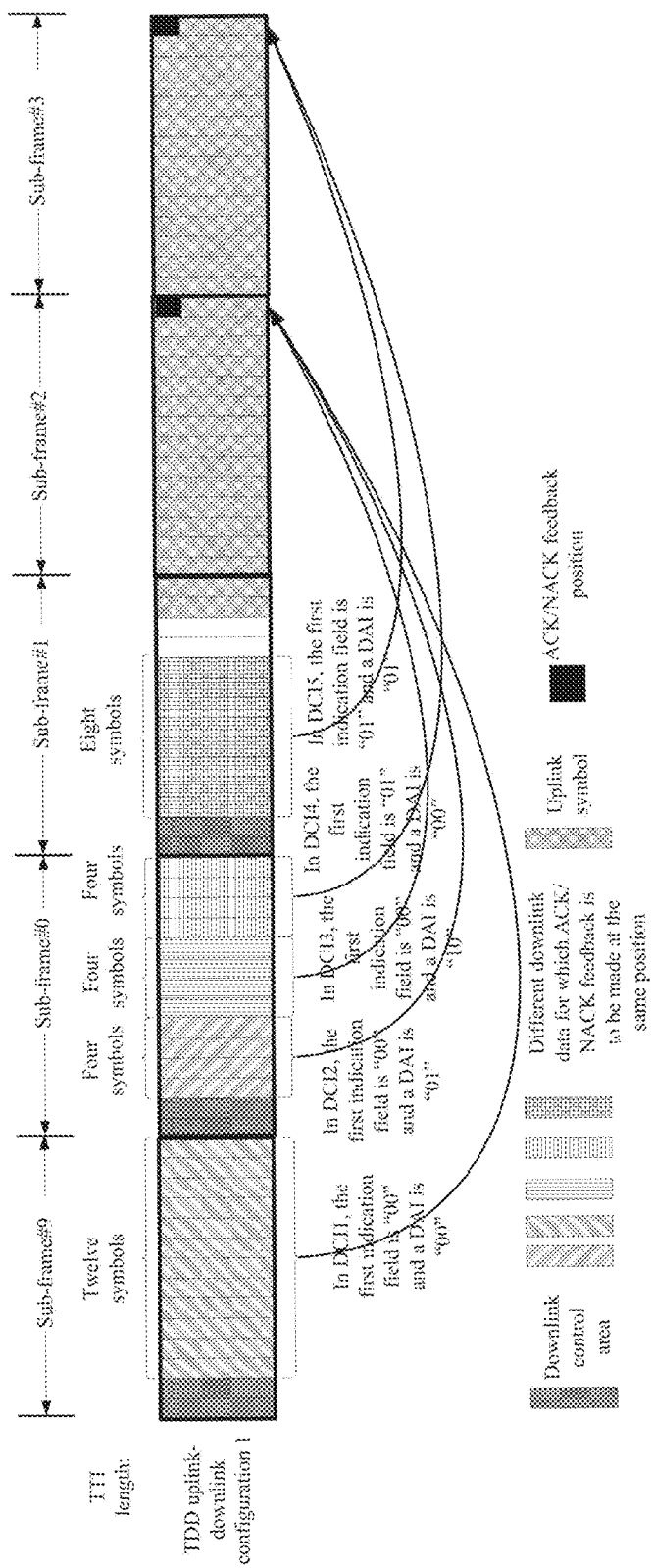
FIG. 8 is a schematic diagram of indicating, in DCI, time domain positions for transmitting ACK/NACK feedback information corresponding to downlink transmission by a terminal over different resources in different sub-frames according to a fourth particular embodiment of the application.

In this particular embodiment, FIG. 8 illustrates a schematic diagram of indicating, in DCI, time domain positions for transmitting ACK/NACK feedback information corresponding to downlink transmission by a terminal over different resources in different sub-frames. The time domain positions are particularly indicated as follows.

In the first instance, the first indication field in DCI1 of a physical downlink control channel corresponding to the first downlink transmission in the sub-frame #9 is "00", and the sub-frame number indicated by the first indication field is less than the index of the sub-frame in which the DCI is transmitted, so it is determined that ACK/NACK of the downlink transmission is to be transmitted in the last symbol in the sub-frame #2 of a succeeding radio frame. The first indication fields in DCI2 of a physical downlink control channel corresponding to the second downlink transmission, and DCI3 of a physical downlink control channel corresponding to the third downlink transmission in the sub-frame #0 are also "00", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK of the two downlink transmission is to be transmitted in the last symbol in the sub-frame #2 of the current radio frame, that is, at the same position as the ACK/NACK of the first downlink transmission. The ACK/NACK feedback information corresponding to the first, second and third downlink transmission is sorted according to DAI indication fields in the DCI 1, the DCI2 and the DCI3, and a resulting sorted ACK/NACK sequence is transmitted at the determined time domain position.

In the second instance, the first indication field in DCI4 of a physical downlink control channel corresponding to the fourth downlink transmission in the sub-frame #0 is "01", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK of the downlink transmission is to be transmitted in the last symbol in the sub-frame #3. The first indication field in DCI5 of a physical downlink control channel corresponding to the fifth downlink transmission in the sub-frame #1 is also "01", the sub-frame number indicated by the first indication field is not less than the index of the sub-frame in which the DCI is transmitted, and the last symbol in the sub-frame indicated by the first indication field of the current radio frame satisfies the feedback delay, so it is determined that ACK/NACK of the downlink transmission is also to be transmitted in the last symbol in the sub-frame #3, that is, at the same position as the ACK/NACK of the fourth downlink transmission. The ACK/NACK feedback information corresponding to the fourth and fifth downlink transmission is sorted according to DAI indication fields in the DCI4 and the DCI5, and a resulting sorted ACK/NACK sequence is transmitted at the determined time domain position.

The base station determines a time domain position corresponding to ACK/NACK feedback information of each downlink transmission, and a sorting order of the ACK/NACK feedback information, in the same way as the first and second instances above to thereby be consistent with the operations of the terminal to parse correctly the ACK/NACK feedback information transmitted by the terminal.

It shall be noted that the fourth particular embodiment can also be applicable to a sub-frame/symbol/TTI defined for transmitting ACK/NACK, so a repeated description thereof will be omitted here.

Furthermore the first indication field in the third particular embodiment and the fourth particular embodiment can be modified to only indicate a time domain position of ACK/NACK feedback information in half a radio frame. For example, in the fourth particular embodiment, the first indication field in the DCI can be further reduced to one bit indicating a correspondence relationship as depicted in Table 9.

TABLE 9

A correspondence relationship between a first indication field in DCI and an indicated time domain position of ACK/NACK feedback information.

| State of the first indication field | Value of the first indication field or time domain position index | Time domain position of ACK/NACK feedback information |
| --- | --- | --- |
| 0 | 1 | The last symbol in the sub-frame #2 (the first half of a frame) or 7 (the second half of the frame) |
| 1 | 2 | The last symbol in the sub-frame #3 (the first half of a frame) or 8 (the second half of the frame) |

Figure 9:
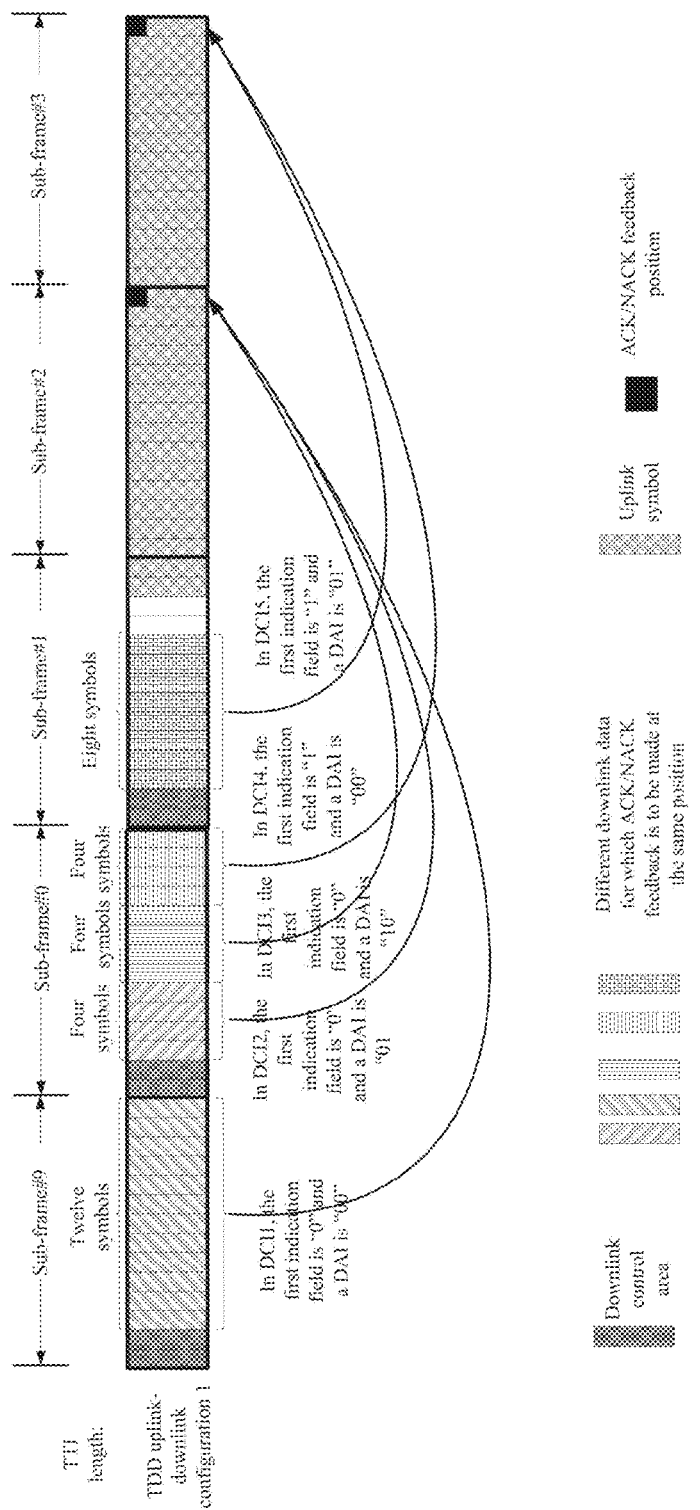
FIG. 9 is another schematic diagram of indicating, in DCI, time domain positions for transmitting ACK/NACK feedback information corresponding to downlink transmission by a terminal over different resources in different sub-frames according to the fourth particular embodiment of the application.

As illustrated in FIG. 9, it can be determined particularly as follows whether the half-frame corresponding to the indicated time domain position of ACK/NACK is the first half or the second half of the current frame, or the first half or the second half of a succeeding frame, according to the relationship between a sub-frame number and a processing delay as described above.

In the third instance, the first indication field in DCI 1 of a physical downlink control channel corresponding to the first downlink transmission in the sub-frame #9 is "0", which corresponds to the last symbol in the sub-frame #2 or #7, and since both the indexes of the sub-frames #2 and #7 are less than the index of the sub-frame in which the DCI is transmitted, it is determined that ACK/NACK of the downlink transmission is to be transmitted in a succeeding radio frame, and since the last symbol in the sub-frame #2 of the succeeding radio frame is the most recent time domain position satisfying the feedback delay, it is determined that the ACK/NACK of the downlink transmission is to be transmitted in the last symbol in the sub-frame #2 of the succeeding radio frame. The first indication fields in DCI2 of a physical downlink control channel corresponding to the second downlink transmission, and DCI3 of a physical downlink control channel corresponding to the third downlink transmission in the sub-frame #0 are also "0", which corresponds to the last symbol in the sub-frame #2 or #7, the sub-frame number indicated by the first indication field is not less than the index of the sub-frame in which the DCI is transmitted, and the last symbol in the sub-frame #2 indicated by the first indication field of the current radio frame is the most recent time domain position satisfying the feedback delay, so it is determined that ACK/NACK of the two downlink transmission is to be transmitted in the last symbol in the sub-frame #2 of the current radio frame, that is, at the same position as the ACK/NACK of the first downlink transmission. The ACK/NACK feedback information corresponding to the first, second and third downlink transmission is sorted according to DAI indication fields in the DCI1, the DCI2 and the DCI3, and a resulting sorted ACK/NACK sequence is transmitted at the determined time domain position.

In the fourth instance, the first indication field in DCI4 of a physical downlink control channel corresponding to the fourth downlink transmission in the sub-frame #0 is "1", which corresponds to the last symbol in the sub-frame #3 or #8, the sub-frame number indicated by the first indication field is not less than the index of the sub-frame in which the DCI is transmitted, and the last symbol in the sub-frame #3 indicated by the first indication field of the current radio frame is the most recent time domain position satisfying the feedback delay, so it is determined that ACK/NACK of the downlink transmission is to be transmitted in the last symbol in the sub-frame #3. The first indication field in DCI5 of a physical downlink control channel corresponding to the fifth downlink transmission in the sub-frame #1 is also "1", which corresponds to the last symbol in the sub-frame #3 or #8, the sub-frame number indicated by the first indication field is not less than the index of the sub-frame in which the DCI is transmitted, and the last symbol in the sub-frame #3 indicated by the first indication field of the current radio frame is the most recent time domain position satisfying the feedback delay, so it is determined that the ACK/NACK of the downlink transmission is also to be transmitted in the last symbol in the sub-frame #3, that is, at the same position as the ACK/NACK of the fourth downlink transmission. The ACK/NACK feedback information corresponding to the fourth and fifth downlink transmission is sorted according to DAI indication fields in the DCI4 and the DCI5, and a resulting sorted ACK/NACK sequence is transmitted at the determined time domain position.

The base station determines a time domain position corresponding to ACK/NACK feedback information of each downlink transmission, and a sorting order of the ACK/NACK feedback information, in the same way as the third and fourth instances above to thereby be consistent with the operations of the terminal to parse correctly the ACK/NACK feedback information transmitted by the terminal.

It shall be noted that in the respective embodiments above, the ACK/NACK feedback information is transmitted in only one symbol as described above by way of an example, but the ACK/NACK can alternatively be transmitted in more than one symbols, e.g., 2, 3, 4, 5, 7, etc., symbols, or in 1 ms (12 or 14 symbols), and in another example, the ACK/NACK can be transmitted in one or more mini-slots, one or more TTIs, one or more slots, or one or more sub-frames, and at this time, the time domain position of the ACK/NACK feedback information can be determined similarly. The respective mapping tables above between a first indication field and an ACK/NACK time domain position include only sub-frame and symbol positions by way of an example, but the mapping tables can alternatively indicate an ACK/NACK time domain resource using more than one of sub-frame/symbol/TTI/slot/mini-slot numbers. There is only one carrier in the respective embodiments above by way of an example, but when carriers are aggregated, the same will apply to each carrier except that for an SCC, an ACK/NACK time domain resource indicated by the first indication field in DCI thereof lies over a carrier over which ACK/NACK can be transmitted (e.g., a PCC, or an SCC over which ACK/NACK can be carried), and when ACK/NACK of downlink transmission over a plurality of carriers is to be transmitted over the same time domain resource, the ACK/NACK of the plurality of carrier is concatenated together, and transmitted concurrently in the same channel.

With the technical solutions above, in the embodiments of the application, the time domain position for transmitting the ACK/NACK feedback information can be signaled in the physical downlink control channel so that the eNB can control flexibly an ACK/NACK load to be balanced over different uplink transmission resources, while shortening a feedback delay as many as possible, to thereby improve the performance of the system.

Figure 10:
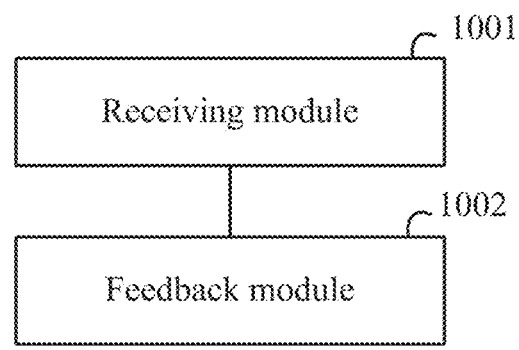
FIG. 10 is a schematic structural diagram of a terminal according to the embodiments of the application.

Based upon the same inventive concept, the embodiments of the application provide a terminal, and reference can be made to the description of the embodiments of the method for a particular implementation of the terminal, so a repeated description thereof will be omitted here. As illustrated in FIG. 10, the terminal generally includes: a receiving module 1001 configured to receive a first physical downlink control channel, where Downlink Control Information (DCI) of the first physical downlink control channel carries a first indication field for determining a time domain position of ACK/NACK feedback information; and a feedback module 1002 configured to determine a time domain position of ACK/NACK feedback information of the first physical downlink control channel or a first physical downlink shared channel corresponding to the first physical downlink control channel according to the first indication field, and to transmit the ACK/NACK feedback information at the time domain position of the ACK/NACK feedback information.

Optionally the first indication field indicates K time domain positions at which ACK/NACK feedback information can be transmitted, where K is a positive integer.

Optionally the first indication field includes P bits of information, where P=⌈$\log_2$ K⌉, and "⌈ ⌉" represents rounding up.

Optionally the first indication field indicates a position of a radio frame or a half-frame or a sub-frame or a slot or a TTI or a mini-slot or a symbol including the time domain position for transmitting the ACK/NACK feedback information.

Optionally the feedback module is further configured to determine a position of a radio frame or a half-frame or a sub-frame or a slot or a mini-slot or a symbol, including the time domain position of the ACK/NACK feedback information indicated by the first indication field, according to a first TTI length and/or a second TTI length, where the first TTI length is a TTI length of the first physical downlink control channel and/or the first physical downlink shared channel corresponding to the first physical downlink control channel, and the second TI length is a preconfigured or pre-agreed TTI length for determining the time domain position of the ACK/NACK feedback information.

Optionally the feedback module is further configured to determine a position of a radio frame or a half-frame or a sub-frame or a TTI or a slot or a mini-slot or a symbol, including the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

Optionally the time domain position of the ACK/NACK feedback information is one or a combination of the following instances.

The radio frame including the time domain position of the ACK/NACK feedback information is: a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, where n1 is a positive integer.

The half-frame including the time domain position of the ACK/NACK feedback information is: a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, where n2 is a positive integer.

The sub-frame including the time domain position of the ACK/NACK feedback information is: a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, where n3 is a positive integer.

The slot including the time domain position of the ACK/NACK feedback information is: a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, where n4 is a positive integer.

The mini-slot including the time domain position of the ACK/NACK feedback information is: a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, where n5 is a positive integer.

The TTI including the time domain position of the ACK/NACK feedback information is: a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, where n6 is a positive integer.

The symbol including the time domain position of the ACK/NACK feedback information is: a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, where n7 is a positive integer.

Optionally the first indication field indicates a position of a first symbol to be occupied for transmitting the ACK/NACK feedback information, and the ACK/NACK feedback information occupies A consecutive uplink symbols starting with the first symbol, where A is a positive integer.

Or, the first indication field indicates a position of a first TTI to be occupied for transmitting the ACK/NACK feedback information, and the ACK/NACK feedback information occupies A consecutive uplink TTIs starting with the first TTI.

Or, the first indication field indicates a position of a first slot to be occupied for transmitting the ACK/NACK feedback information, and the ACK/NACK feedback information occupies A consecutive slots starting with the first slot.

Or, the first indication field indicates a position of a first mini-slot to be occupied for transmitting the ACK/NACK feedback information, and the ACK/NACK feedback information occupies A consecutive mini-slots starting with the first mini-slot.

Or, the first indication field indicates a position of a first sub-frame to be occupied for transmitting the ACK/NACK feedback information, and the ACK/NACK feedback information occupies A consecutive sub-frames starting with the first sub-frame.

Optionally the feedback module is configured: if the terminal determines the same time domain position of the ACN/ACK feedback information respectively according to the first indication fields of a plurality of the first physical downlink channels, to concatenate ACK/NACK feedback information, of respective first physical downlink channels among the plurality of the first physical downlink channels or of first physical downlink shared channels corresponding to the respective first physical downlink channels, according to Downlink Assignment Index (DAI) indication fields in the DCI of the plurality of the first physical downlink channels, and to transmit a concatenated ACK/NACK feedback information at the same time domain position of the ACK/NACK feedback information.

Optionally the time domain position is any one of: an index of a sub-frame and/or an index of a symbol and/or an index of a TTI and/or an index of a slot and/or an index of a mini-slot.

Figure 11:
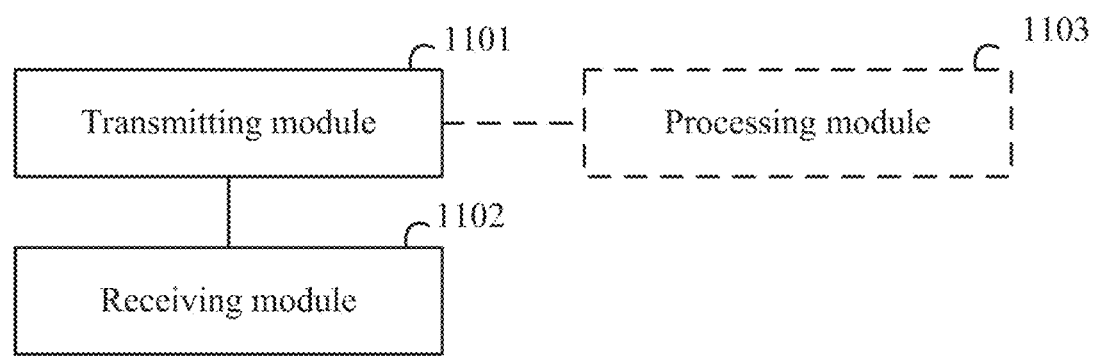
FIG. 11 is a schematic structural diagram of a base station according to the embodiments of the application.

Based upon the same inventive concept, the embodiments of the application provide a base station, and reference can be made to the description of the embodiments of the method for a particular implementation of the base station, so a repeated description thereof will be omitted here. As illustrated in FIG. 11, the base station generally includes: a transmitting module 1101 configured to transmit a first physical downlink control channel to a terminal, where Downlink Control Information (DCI) of the first physical downlink control channel carries a first indication field for determining a time domain position of ACK/NACK feedback information; and a receiving module 1102 configured to receive ACK/NACK feedback information, fed back by the terminal, of the first physical downlink control channel or a first physical downlink shared channel corresponding to the first physical downlink control channel, at the time domain position of the ACK/NACK feedback information, determined according to the first indication field.

Optionally the first indication field indicates K time domain positions at which ACK/NACK feedback information can be transmitted, where K is a positive integer.

Optionally the first indication field includes P bits of information, where P=⌈log₂ K⌉, and "⌈ ⌉" represents rounding up.

Optionally the first indication field indicates a position of a radio frame or a half-frame or a sub-frame or a slot or a TTI or a mini-slot or a symbol including the time domain position for transmitting the ACK/NACK feedback information.

Optionally the base station further includes a processing module 1103 configured to determine a position of a radio frame or a half-frame or a sub-frame or a slot or a mini-slot or a symbol, including the time domain position of the ACK/NACK feedback information indicated by the first indication field, according to a first TTI length and/or a second TTI length, where the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

Optionally the base station further includes a processing module configured to determine a position of a radio frame or a half-frame or a sub-frame or a TTI or a slot or a mini-slot or a symbol, including the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

Optionally the time domain position of the ACK/NACK feedback information is one or a combination of the following instances.

The radio frame including the time domain position of the ACK/NACK feedback information is: a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, where n1 is a positive integer.

The half-frame including the time domain position of the ACK/NACK feedback information is: a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, where n2 is a positive integer.

The sub-frame including the time domain position of the ACK/NACK feedback information is: a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, where n3 is a positive integer.

The slot including the time domain position of the ACK/NACK feedback information is: a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, where n4 is a positive integer.

The mini-slot including the time domain position of the ACK/NACK feedback information is: a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, where n5 is a positive integer.

The TTI including the time domain position of the ACK/NACK feedback information is: a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, where n6 is a positive integer.

The symbol including the time domain position of the ACK/NACK feedback information is: a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, where n7 is a positive integer.

Optionally the first indication field indicates a position of a first symbol to be occupied for transmitting the ACK/NACK feedback information, and the ACK/NACK feedback information occupies A consecutive uplink symbols starting with the first symbol, where A is a positive integer.

Or, the first indication field indicates a position of a first TTI to be occupied for transmitting the ACK/NACK feedback information, and the ACK/NACK feedback information occupies A consecutive uplink TTIs starting with the first TTI.

Or, the first indication field indicates a position of a first slot to be occupied for transmitting the ACK/NACK feedback information, and the ACK/NACK feedback information occupies A consecutive slots starting with the first slot.

Or, the first indication field indicates a position of a first mini-slot to be occupied for transmitting the ACK/NACK feedback information, and the ACK/NACK feedback information occupies A consecutive mini-slots starting with the first mini-slot.

Or, the first indication field indicates a position of a first sub-frame to be occupied for transmitting the ACK/NACK feedback information, and the ACK/NACK feedback information occupies A consecutive sub-frames starting with the first sub-frame.

Optionally the base station further includes a processing module configured: if the base station determines the same time domain position of the ACK/NACK feedback information indicated by the first indication fields of a plurality of the first physical downlink channels of the terminal, to determine a concatenation order of ACK/NACK feedback information, of respective first physical downlink channels among the plurality of the first physical downlink channels or of the first physical downlink shared channels corresponding to the respective first physical downlink channels, according to Downlink Assignment Index (DAI) indication fields in the DCI of the plurality of the first physical downlink channels, and to parse the ACK/NACK feedback information received at the same time domain position according to the determined concatenation order.

Optionally the time domain position is any one of: an index of a sub-frame and/or an index of a symbol and/or an index of a TTI and/or an index of a slot and/or an index of a mini-slot.

Figure 12:
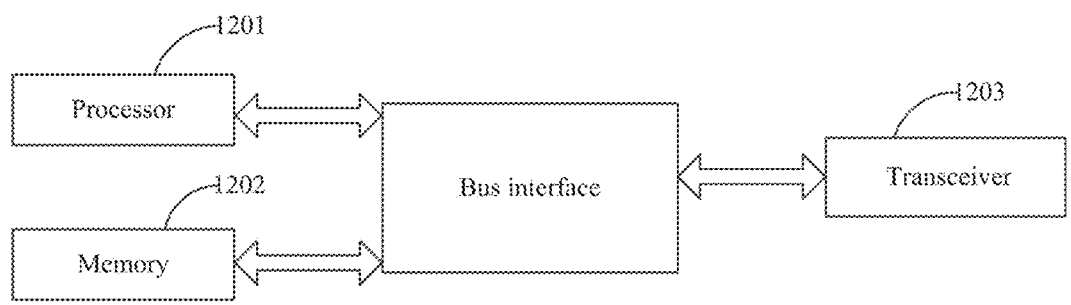
FIG. 12 is a schematic structural diagram of another terminal according to the embodiments of the application.

Based upon the same inventive concept, the embodiments of the application further provide another terminal, and reference can be made to the description of the embodiments of the method for a particular embodiment of the terminal, so a repeated description thereof will be omitted here. As illustrated in FIG. 12, the terminal generally includes a processor 1201, a memory 1202 and a transceiver 1203, where the transceiver 1203 is configured to receive and transmit data under the control of the processor 1201, the memory 1202 is configured to store preset programs, and the processor 1201 is configured to read the programs stored in the memory 1202 to: receive a first physical downlink control channel through the transceiver 1203, where Downlink Control Information (DCI) of the first physical downlink control channel carries a first indication field for determining a time domain position of ACK/NACK feedback information; and determine a time domain position of ACK/NACK feedback information of the first physical downlink control channel or a first physical downlink shared channel corresponding to the first physical downlink control channel according to the first indication field, and to instruct the transceiver 1203 to transmit the ACK/NACK feedback information at the time domain position of the ACK/NACK feedback information.

Optionally the first indication field indicates K time domain positions at which ACK/NACK feedback information can be transmitted, where K is a positive integer.

Optionally the first indication field includes P bits of information, where P=$\lceil \log_2 K \rceil$, and "$\lceil\ \rceil$" represents rounding up.

Optionally the first indication field indicates a position of a radio frame or a half-frame or a sub-frame or a slot or a TTI or a mini-slot or a symbol including the time domain position for transmitting the ACK/NACK feedback information.

Optionally the processor is further configured to determine a position of a radio frame or a half-frame or a sub-frame or a slot or a mini-slot or a symbol including the time domain position of the ACK/NACK feedback information indicated by the first indication field, according to a first TTI length and/or a second TTI length, where the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information.

Optionally the processor is further configured to determine a position of a radio frame or a half-frame or a sub-frame or a TTI or a slot or a mini-slot or a symbol including the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

Optionally the time domain position of the ACK/NACK feedback information is one or a combination of the following instances.

The radio frame including the time domain position of the ACK/NACK feedback information is: a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, where n1 is a positive integer.

The half-frame including the time domain position of the ACK/NACK feedback information is: a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, where n2 is a positive integer.

The sub-frame including the time domain position of the ACK/NACK feedback information is: a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, where n3 is a positive integer.

The slot including the time domain position of the ACK/NACK feedback information is: a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, where n4 is a positive integer.

The mini-slot including the time domain position of the ACK/NACK feedback information is: a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, where n5 is a positive integer.

The TTI including the time domain position of the ACK/NACK feedback information is: a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, where n6 is a positive integer.

The symbol including the time domain position of the ACK/NACK feedback information is: a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, where n7 is a positive integer.

Optionally the first indication field indicates a position of a first symbol to be occupied for transmitting the ACK/NACK feedback information, and the ACK/NACK feedback information occupies A consecutive uplink symbols starting with the first symbol, where A is a positive integer.

Or, the first indication field indicates a position of a first TTI to be occupied for transmitting the ACK/NACK feedback information, and the ACK/NACK feedback information occupies A consecutive uplink TTIs starting with the first TTI.

Or, the first indication field indicates a position of a first slot to be occupied for transmitting the ACK/NACK feedback information, and the ACK/NACK feedback information occupies A consecutive slots starting with the first slot.

Or, the first indication field indicates a position of a first mini-slot to be occupied for transmitting the ACK/NACK feedback information, and the ACK/NACK feedback information occupies A consecutive mini-slots starting with the first mini-slot.

Or, the first indication field indicates a position of a first sub-frame to be occupied for transmitting the ACK/NACK feedback information, and the ACK/NACK feedback information occupies A consecutive sub-frames starting with the first sub-frame.

Optionally the processor is configured: if the terminal determines the same time domain position of the ACK/NACK feedback information respectively according to the first indication fields of a plurality of the first physical downlink channels, to concatenate ACK/NACK feedback information, of respective first physical downlink channels among the plurality of the first physical downlink channels or of first physical downlink shared channels corresponding to the respective first physical downlink channels, according to Downlink Assignment Index (DAI) indication fields in the DCI of the plurality of the first physical downlink channels, and to transmit a concatenated ACK/NACK feedback information at the same time domain position of the ACK/NACK feedback information.

Optionally the time domain position is any one of: an index of a sub-frame and/or an index of a symbol and/or an index of a TTI and/or an index of a slot and/or an index of a mini-slot.

Here the processor, the memory, and the transceiver are connected with each other over a bus, and the bus architecture can include any number of interconnecting buses and bridges to particularly link together various circuits including one or more processors represented by the processor, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver can be a number of elements, i.e., a transmitter and a receiver, which are units for communication with various other devices over a transmission medium. The processor is responsible for managing the bus architecture and performing normal processes, and the memory can store data for use by the processor in performing operations.

Figure 13:
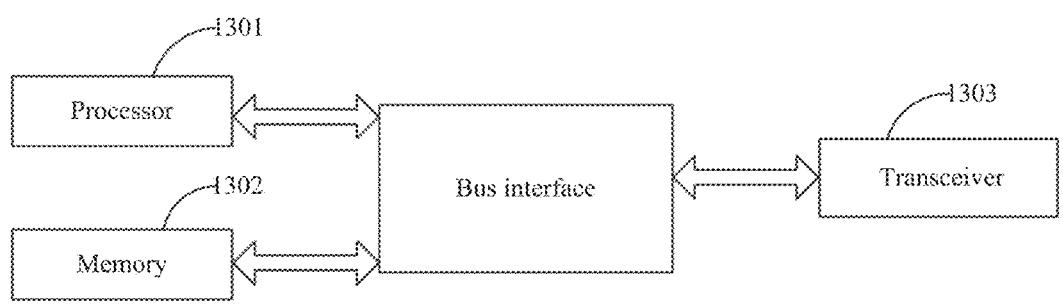
FIG. 13 is a schematic structural diagram of another base station according to the embodiments of the application.

Based upon the same inventive concept, the embodiments of the application further provide another base station, and reference can be made to the description of the embodiments of the method for a particular embodiment of the base station, so a repeated description thereof will be omitted here. As illustrated in FIG. 13, the base station generally includes a processor 1301, a memory 1302 and a transceiver 1303, where the transceiver 1303 is configured to receive and transmit data under the control of the processor 1301, the memory 1302 is configured to store preset programs, and the processor 1301 is configured to read the programs stored in the memory 1302 to: transmit a first physical downlink control channel to a terminal through the transceiver 1303, where Downlink Control Information (DCI) of the first physical downlink control channel carries a first indication field for determining a time domain position of the ACK/NACK feedback information; and instruct the transceiver 1303 to receive ACK/NACK feedback information, fed back by the terminal, of the first physical downlink control channel or a first physical downlink shared channel corresponding to the first physical downlink control channel, at the time domain position of the ACK/NACK feedback information, determined according to the first indication field.

Optionally the first indication field indicates K time domain positions at which ACK/NACK feedback information can be transmitted, where K is a positive integer.

Optionally the first indication field includes P bits of information, where P=$\lceil \log_2 K \rceil$, and "$\lceil \: \rceil$" represents rounding up.

Optionally the first indication field indicates a position of a radio frame or a half-frame or a sub-frame or a slot or a TTI or a mini-slot or a symbol including the time domain position for transmitting the ACK/NACK feedback information.

Optionally the processor is further configured to determine a position of a radio frame or a half-frame or a sub-frame or a slot or a mini-slot or a symbol including the time domain position, of the ACK/NACK feedback information, indicated by the first indication field according to a first TI length and/or a second TTI length, where the first TTI length is a TTI length of the first physical downlink control channel and/or the first physical downlink shared channel corresponding to the first physical downlink control channel, and the second TI length is a preconfigured or pre-agreed TTI length for determining the time domain position of the ACK/NACK feedback information.

Optionally the processor is further configured to determine a position of a radio frame or a half-frame or a sub-frame or a TTI or a slot or a mini-slot or a symbol including the time domain position, of the ACK/NACK feedback information, indicated by the first indication field according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot including the time domain position of the ACK/NACK feedback information indicated by the first indication field.

Optionally the time domain position of the ACK/NACK feedback information is one or a combination of the following instances.

The radio frame including the time domain position of the ACK/NACK feedback information is: a radio frame in which the first physical downlink control channel or the first physical downlink shared channel corresponding to the first physical downlink control channel is transmitted, or the n1-th radio frame after a radio frame in which the first physical downlink control channel or the first physical downlink shared channel corresponding to the first physical downlink control channel is transmitted, where n is a positive integer.

The half-frame including the time domain position of the ACK/NACK feedback information is: a half-frame in which the first physical downlink control channel or the first physical downlink shared channel corresponding to the first physical downlink control channel is transmitted, or the n2-th half-frame after a half-frame in which the first physical downlink control channel or the first physical downlink shared channel corresponding to the first physical downlink control channel is transmitted, where n2 is a positive integer.

The sub-frame including the time domain position of the ACK/NACK feedback information is: a sub-frame in which the first physical downlink control channel or the first physical downlink shared channel corresponding to the first physical downlink control channel is transmitted, or the n3-th sub-frame after a sub-frame in which the first physical downlink control channel or the first physical downlink shared channel corresponding to the first physical downlink control channel is transmitted, where n3 is a positive integer.

The slot including the time domain position of the ACK/NACK feedback information is: a slot in which the first physical downlink control channel or the first physical downlink shared channel corresponding to the first physical downlink control channel is transmitted, or the n4-th slot after a slot in which the first physical downlink control channel or the first physical downlink shared channel corresponding to the first physical downlink control channel is transmitted, where n4 is a positive integer.

The mini-slot including the time domain position of the ACK/NACK feedback information is: a mini-slot in which the first physical downlink control channel or the first physical downlink shared channel corresponding to the first physical downlink control channel is transmitted, or the n5-th mini-slot after a mini-slot in which the first physical downlink control channel or the first physical downlink shared channel corresponding to the first physical downlink control channel is transmitted, where n5 is a positive integer.

The TTI including the time domain position of the ACK/NACK feedback information is: a TTI in which the first physical downlink control channel or the first physical downlink shared channel corresponding to the first physical downlink control channel is transmitted, or the n6-th TTI after a TTI in which the first physical downlink control channel or the first physical downlink shared channel corresponding to the first physical downlink control channel is transmitted, where n6 is a positive integer.

The symbol including the time domain position of the ACK/NACK feedback information is: a symbol in which the first physical downlink control channel or the first physical downlink shared channel corresponding to the first physical downlink control channel is transmitted, or the n7-th symbol after a symbol in which the first physical downlink control channel or the first physical downlink shared channel corresponding to the first physical downlink control channel is transmitted, where n7 is a positive integer.

Optionally the first indication field indicates a position of a first symbol to be occupied for transmitting the ACK/NACK feedback information, and the ACK/NACK feedback information occupies A consecutive uplink symbols starting with the first symbol, where A is a positive integer.

Or, the first indication field indicates a position of a first TTI to be occupied for transmitting the ACK/NACK feedback information, and the ACK/NACK feedback information occupies A consecutive uplink TTIs starting with the first TTI.

Or, the first indication field indicates a position of a first slot to be occupied for transmitting the ACK/NACK feedback information, and the ACK/NACK feedback information occupies A consecutive slots starting with the first slot.

Or, the first indication field indicates a position of a first mini-slot to be occupied for transmitting the ACK/NACK feedback information, and the ACK/NACK feedback information occupies A consecutive mini-slots starting with the first mini-slot.

Or, the first indication field indicates a position of a first sub-frame to be occupied for transmitting the ACK/NACK feedback information, and the ACK/NACK feedback information occupies A consecutive sub-frames starting with the first sub-frame.

Optionally the processor is further configured: if the base station determines the same time domain position of the ACK/NACK feedback information indicated by the first indication fields of a plurality of the first physical downlink channels of the terminal, to determine a concatenation order of ACK/NACK feedback information, of respective first physical downlink channels among the plurality of the first physical downlink channels or of the first physical downlink shared channels corresponding to the respective first physical downlink channels, according to Downlink Assignment Index (DAI) indication fields in the DCI of the plurality of the first physical downlink channels, and to parse the ACK/NACK feedback information received at the same time domain position according to the determined concatenation order.

Optionally the time domain position is any one of: an index of a sub-frame and/or an index of a symbol and/or an index of a TTI and/or an index of a slot and/or an index of a mini-slot.

Here the processor, the memory, and the transceiver are connected with each other over a bus, and the bus architecture can include any number of interconnecting buses and bridges to particularly link together various circuits including one or more processors represented by the processor, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver can be a number of elements, i.e., a transmitter and a receiver, which are units for communication with various other devices over a transmission medium. The processor is responsible for managing the bus architecture and performing normal processes, and the memory can store data for use by the processor in performing operations.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for feeding back Acknowledgment/Negative Acknowledgement (ACK/NACK), the method comprising:

receiving, by a terminal, a first physical downlink control channel, wherein Downlink Control Information (DCI) of the first physical downlink control channel carries a first indication field for determining a time domain position of ACK/NACK feedback information; and determining, by the terminal, a time domain position of ACK/NACK feedback information of the first physical downlink control channel or a first physical downlink shared channel corresponding to the first physical downlink control channel according to the first indication field, and transmitting the ACK/NACK feedback information at the time domain position of the ACK/NACK feedback information;

wherein the first indication field indicates K time domain positions at which ACK/NACK feedback information is able to be transmitted, wherein K is a positive integer; wherein the first indication field comprises P bits of information, wherein $P=\lceil \log_2 K \rceil$, and "$\lceil \ \rceil$" represents rounding up;

or, the first indication field indicates a position of a mini-slot or a symbol comprising a time domain position for transmitting the ACK/NACK feedback information;

or, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first Transmission Time Interval (TTI) to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame, wherein A is a positive integer greater than 1.

2. The method according to claim 1, wherein the method further comprises:

determining, by the terminal, a position of a radio frame or a half-frame or a sub-frame or a slot or a mini-slot or a symbol comprising the time domain position of the ACK/NACK feedback information indicated by the first indication field, according to a first Transmission Time Interval (TTI) length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information;

or, the method further comprises:

determining, by the terminal, a position of a radio frame or a half-frame or a sub-frame or a Transmission Time Interval (TTI) or a slot or a mini-slot or a symbol comprising the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot comprising the time domain position of the ACK/NACK feedback information indicated by the first indication field.

3. The method according to claim 2, wherein the time domain position of the ACK/NACK feedback information is one or a combination of following instances:

the radio frame comprising the time domain position of the ACK/NACK feedback information is a radio frame in which the first physical downlink control channel or the first physical downlink shared channel corresponding to the first physical downlink control channel is transmitted, or an n1-th radio frame after a radio frame in which the first physical downlink control channel or the first physical downlink shared channel corresponding to the first physical downlink control channel is transmitted, wherein n1 is a positive integer;

the half-frame comprising the time domain position of the ACK/NACK feedback information is a half-frame in which the first physical downlink control channel or the first physical downlink shared channel corresponding to the first physical downlink control channel is transmitted, or an n2-th half-frame after a half-frame in which the first physical downlink control channel or the first physical downlink shared channel corresponding to the first physical downlink control channel is transmitted, wherein n2 is a positive integer;

the sub-frame comprising the time domain position of the ACK/NACK feedback information is a sub-frame in which the first physical downlink control channel or the first physical downlink shared channel corresponding to the first physical downlink control channel is transmitted, or an n3-th sub-frame after a sub-frame in which the first physical downlink control channel or the first physical downlink shared channel corresponding to the first physical downlink control channel is transmitted, wherein n3 is a positive integer;

the slot comprising the time domain position of the ACK/NACK feedback information is a slot in which the first physical downlink control channel or the first physical downlink shared channel corresponding to the first physical downlink control channel is transmitted, or an n4-th slot after a slot in which the first physical downlink control channel or the first physical downlink shared channel corresponding to the first physical downlink control channel is transmitted, wherein n4 is a positive integer;

the mini-slot comprising the time domain position of the ACK/NACK feedback information is a mini-slot in which the first physical downlink control channel or the first physical downlink shared channel corresponding to the first physical downlink control channel is transmitted, or an n5-th mini-slot after a mini-slot in which the first physical downlink control channel or the first physical downlink shared channel corresponding to the first physical downlink control channel is transmitted, wherein n5 is a positive integer;

the TTI comprising the time domain position of the ACK/NACK feedback information is a TTI in which the first physical downlink control channel or the first physical downlink shared channel corresponding to the first physical downlink control channel is transmitted, or an n6-th TTI after a TTI in which the first physical downlink control channel or the first physical downlink shared channel corresponding to the first physical downlink control channel is transmitted, wherein n6 is a positive integer; and the symbol comprising the time domain position of the ACK/NACK feedback information is a symbol in which the first physical downlink control channel or the first physical downlink shared channel corresponding to the first physical downlink control channel is transmitted, or an n7-th symbol after a symbol in which the first physical downlink control channel or the first physical downlink shared channel corresponding to the first physical downlink control channel is transmitted, wherein n7 is a positive integer.

4. The method according to claim 1, wherein if the terminal determines a same time domain position of ACK/NACK feedback information respectively according to first indication fields of a plurality of first physical downlink channels, then transmitting, by the terminal, the ACK/NACK feedback information at the time domain position of the ACK/NACK feedback information comprises:

concatenating, by the terminal, ACK/NACK feedback information of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels; and transmitting, by the terminal, a concatenated ACK/NACK feedback information at the same time domain position of the ACK/NACK feedback information.

5. A method for feeding back Acknowledgment/Negative Acknowledgement (ACK/NACK), the method comprising:

transmitting, by a base station, a first physical downlink control channel to a terminal, wherein Downlink Control Information (DCI) of the first physical downlink control channel carries a first indication field for determining a time domain position of ACK/NACK feedback information; and receiving, by the base station, ACK/NACK feedback information, fed back by the terminal, of the first physical downlink control channel or a first physical downlink shared channel corresponding to the first physical downlink control channel, at the time domain position of the ACK/NACK feedback information determined according to the first indication field;

wherein the first indication field indicates K time domain positions at which ACK/NACK feedback information is able to be transmitted, wherein K is a positive integer; wherein the first indication field comprises P bits of information, wherein P=$\lceil \log_2 K \rceil$, and "$\lceil \ \rceil$" represents rounding up;

or, the first indication field indicates a position of a mini-slot or a symbol comprising a time domain position for transmitting the ACK/NACK feedback information;

or, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first Transmission Time Interval (TTI) to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame, wherein A is a positive integer greater than 1.

6. The method according to claim 5, wherein the method further comprises:

determining, by the base station, a position of a radio frame or a half-frame or a sub-frame or a slot or a mini-slot or a symbol comprising the time domain position of the ACK/NACK feedback information indicated by the first indication field, according to a first Transmission Time Interval (TTI) length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information;

or, the method further comprises:

determining, by the base station, a position of a radio frame or a half-frame or a sub-frame or a Transmission Time Interval (TTI) or a slot or a mini-slot or a symbol comprising the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot comprising the time domain position of the ACK/NACK feedback information indicated by the first indication field.

7. The method according to claim 6, wherein the time domain position of the ACK/NACK feedback information is one or a combination of following instances:

the radio frame comprising the time domain position of the ACK/NACK feedback information is a radio frame in which the first physical downlink control channel or the first physical downlink shared channel corresponding to the first physical downlink control channel is transmitted, or an n1-th radio frame after a radio frame in which the first physical downlink control channel or the first physical downlink shared channel corresponding to the first physical downlink control channel is transmitted, wherein n1 is a positive integer;

the half-frame comprising the time domain position of the ACK/NACK feedback information is a half-frame in which the first physical downlink control channel or the first physical downlink shared channel corresponding to the first physical downlink control channel is transmitted, or an n2-th half-frame after a half-frame in which the first physical downlink control channel or the first physical downlink shared channel corresponding to the first physical downlink control channel is transmitted, wherein n2 is a positive integer;

the sub-frame comprising the time domain position of the ACK/NACK feedback information is a sub-frame in which the first physical downlink control channel or the first physical downlink shared channel corresponding to the first physical downlink control channel is transmitted, or an n3-th sub-frame after a sub-frame in which the first physical downlink control channel or the first physical downlink shared channel corresponding to the first physical downlink control channel is transmitted, wherein n3 is a positive integer;

the slot comprising the time domain position of the ACK/NACK feedback information is a slot in which the first physical downlink control channel or the first physical downlink shared channel corresponding to the first physical downlink control channel is transmitted, or an n4-th slot after a slot in which the first physical downlink control channel or the first physical downlink shared channel corresponding to the first physical downlink control channel is transmitted, wherein n4 is a positive integer;

the mini-slot comprising the time domain position of the ACK/NACK feedback information is a mini-slot in which the first physical downlink control channel or the first physical downlink shared channel corresponding to the first physical downlink control channel is transmitted, or an n5-th mini-slot after a mini-slot in which the first physical downlink control channel or the first physical downlink shared channel corresponding to the first physical downlink control channel is transmitted, wherein n5 is a positive integer;

the TTI comprising the time domain position of the ACK/NACK feedback information is a TTI in which the first physical downlink control channel or the first physical downlink shared channel corresponding to the first physical downlink control channel is transmitted, or an n6-th TTI after a TTI in which the first physical downlink control channel or the first physical downlink shared channel corresponding to the first physical downlink control channel is transmitted, wherein n6 is a positive integer; and the symbol comprising the time domain position of the ACK/NACK feedback information is a symbol in which the first physical downlink control channel or the first physical downlink shared channel corresponding to the first physical downlink control channel is transmitted, or an n7-th symbol after a symbol in which the first physical downlink control channel or the first physical downlink shared channel corresponding to the first physical downlink control channel is transmitted, wherein n7 is a positive integer.

8. The method according to claim 5, wherein if the base station determines a same time domain position of ACK/NACK feedback information indicated by first indication fields of a plurality of first physical downlink channels of the terminal, then the method further comprises:
  determining, by the base station, a concatenation order of ACK/NACK feedback information, of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels, and parsing ACK/NACK feedback information received at the same time domain position according to the determined concatenation order.

9. A terminal, comprising at least one processor and a memory;
  wherein the memory is configured to store computer readable program codes, and the at least one processor is configured to execute the computer readable program codes to:
  receive a first physical downlink control channel, wherein Downlink Control Information (DCI) of the first physical downlink control channel carries a first indication field for determining a time domain position of ACK/NACK feedback information; and
  determine a time domain position of ACK/NACK feedback information of the first physical downlink control channel or a first physical downlink shared channel corresponding to the first physical downlink control channel according to the first indication field, and to transmit the ACK/NACK feedback information at the time domain position of the ACK/NACK feedback information;
  wherein the first indication field indicates K time domain positions at which ACK/NACK feedback information is able to be transmitted, wherein K is a positive integer; wherein the first indication field comprises P bits of information, wherein P=$\lceil \log_2 K \rceil$, and "$\lceil \ \rceil$" represents rounding up;
  or,
  the first indication field indicates a position of a mini-slot or a symbol comprising a time domain position for transmitting the ACK/NACK feedback information;
  or,
  the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first Transmission Time Interval (TTI) to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame, wherein A is a positive integer greater than 1.

10. The terminal according to claim 9, wherein the at least one processor is further configured to execute the computer readable program codes to:
  determine a position of a radio frame or a half-frame or a sub-frame or a slot or a mini-slot or a symbol comprising the time domain position of the ACK/NACK feedback information indicated by the first indication field, according to a first Transmission Time Interval (TTI) length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information;
  or,
  the at least one processor is further configured to execute the computer readable program codes to:
  determine a position of a radio frame or a half-frame or a sub-frame or a Transmission Time Interval (TTI) or a slot or a mini-slot or a symbol comprising the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot comprising the time domain position of the ACK/NACK feedback information indicated by the first indication field.

11. The terminal according to claim 10, wherein the time domain position of the ACK/NACK feedback information is one or a combination of following instances:
  the radio frame comprising the time domain position of the ACK/NACK feedback information is a radio frame in which the first physical downlink control channel or the first physical downlink shared channel corresponding to the first physical downlink control channel is transmitted, or an n1-th radio frame after a radio frame in which the first physical downlink control channel or the first physical downlink shared channel corresponding to the first physical downlink control channel is transmitted, wherein n1 is a positive integer;
  the half-frame comprising the time domain position of the ACK/NACK feedback information is a half-frame in which the first physical downlink control channel or the first physical downlink shared channel corresponding to the first physical downlink control channel is transmitted, or an n2-th half-frame after a half-frame in which the first physical downlink control channel or the first physical downlink shared channel corresponding to the first physical downlink control channel is transmitted, wherein n2 is a positive integer;

the sub-frame comprising the time domain position of the ACK/NACK feedback information is a sub-frame in which the first physical downlink control channel or the first physical downlink shared channel corresponding to the first physical downlink control channel is transmitted, or an n3-th sub-frame after a sub-frame in which the first physical downlink control channel or the first physical downlink shared channel corresponding to the first physical downlink control channel is transmitted, wherein n3 is a positive integer;

the slot comprising the time domain position of the ACK/NACK feedback information is a slot in which the first physical downlink control channel or the first physical downlink shared channel corresponding to the first physical downlink control channel is transmitted, or an n4-th slot after a slot in which the first physical downlink control channel or the first physical downlink shared channel corresponding to the first physical downlink control channel is transmitted, wherein n4 is a positive integer;

the mini-slot comprising the time domain position of the ACK/NACK feedback information is a mini-slot in which the first physical downlink control channel or the first physical downlink shared channel corresponding to the first physical downlink control channel is transmitted, or an n5-th mini-slot after a mini-slot in which the first physical downlink control channel or the first physical downlink shared channel corresponding to the first physical downlink control channel is transmitted, wherein n5 is a positive integer;

the TTI comprising the time domain position of the ACK/NACK feedback information is a TTI in which the first physical downlink control channel or the first physical downlink shared channel corresponding to the first physical downlink control channel is transmitted, or an n6-th TTI after a TTI in which the first physical downlink control channel or the first physical downlink shared channel corresponding to the first physical downlink control channel is transmitted, wherein n6 is a positive integer; and the symbol comprising the time domain position of the ACK/NACK feedback information is a symbol in which the first physical downlink control channel or the first physical downlink shared channel corresponding to the first physical downlink control channel is transmitted, or an n7-th symbol after a symbol in which the first physical downlink control channel or the first physical downlink shared channel corresponding to the first physical downlink control channel is transmitted, wherein n7 is a positive integer.

12. The terminal according to claim 9, wherein the at least one processor is further configured to execute the computer readable program codes to:

if the terminal determines a same time domain position of ACK/NACK feedback information respectively according to first indication fields of a plurality of first physical downlink channels, concatenate ACK/NACK feedback information of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels; and transmit a concatenated ACK/NACK feedback information at the same time domain position of the ACK/NACK feedback information.

13. A base station, comprising at least one processor and a memory; wherein the memory is configured to store computer readable program codes, and the at least one processor is configured to execute the computer readable program codes to:

transmit a first physical downlink control channel to a terminal, wherein Downlink Control Information (DCI) of the first physical downlink control channel carries a first indication field for determining a time domain position of Acknowledgment/Negative Acknowledgement (ACK/NACK) feedback information; and receive ACK/NACK feedback information, fed back by the terminal, of the first physical downlink control channel or a first physical downlink shared channel corresponding to the first physical downlink control channel, at the time domain position of the ACK/NACK feedback information determined according to the first indication field;

wherein the first indication field indicates K time domain positions at which ACK/NACK feedback information is able to be transmitted, wherein K is a positive integer; wherein the first indication field comprises P bits of information, wherein $P=\lceil \log_2 K \rceil$, and "$\lceil \ \rceil$" represents rounding up;

or, the first indication field indicates a position of a mini-slot or a symbol comprising a time domain position for transmitting the ACK/NACK feedback information;

or, the first indication field indicates a position of a first symbol to be occupied for transmitting the ACK/NACK feedback information, and the ACK/NACK feedback information occupies A consecutive uplink symbols starting with the first symbol, wherein A is a positive integer; or the first indication field indicates a position of a first Transmission Time Interval (TTI) to be occupied for transmitting the ACK/NACK feedback information, and the ACK/NACK feedback information occupies A consecutive uplink TTIs starting with the first TTI; or the first indication field indicates a position of a first slot to be occupied for transmitting the ACK/NACK feedback information, and the ACK/NACK feedback information occupies A consecutive slots starting with the first slot; or the first indication field indicates a position of a first mini-slot to be occupied for transmitting the ACK/NACK feedback information, and the ACK/NACK feedback information occupies A consecutive mini-slots starting with the first mini-slot; or the first indication field indicates a position of a first sub-frame to be occupied for transmitting the ACK/NACK feedback information, and the ACK/NACK feedback information occupies A consecutive sub-frames starting with the first sub-frame, wherein A is a positive integer greater than 1.

14. The base station according to claim 13, wherein the at least one processor is further configured to execute the computer readable program codes to:

determine a position of a radio frame or a half-frame or a sub-frame or a slot or a mini-slot or a symbol comprising the time domain position of the ACK/NACK feedback information indicated by the first indication field, according to a first Transmission Time Interval (TTI) length and/or a second TTI length, wherein the first TTI length is a TTI length of the first physical downlink control channel and/or the first physical downlink shared channel corresponding to the first physical downlink control channel, and the second TTI length is a preconfigured or pre-agreed TTI length for determining the time domain position of the ACK/NACK feedback information;

or, the at least one processor is further configured to execute the computer readable program codes to:

determine a position of a radio frame or a half-frame or a sub-frame or a Transmission Time Interval (TTI) or a slot or a mini-slot or a symbol comprising the time domain position of the ACK/NACK feedback information indicated by the first indication field, according to a magnitude or sequential order between an index of a sub-frame and/or a TTI and/or a symbol and/or a slot and/or a mini-slot in which the first physical downlink control channel is transmitted, and an index of a sub-frame and/or a TTI and/or a symbol and/or a slot and/or a mini-slot comprising the time domain position of the ACK/NACK feedback information indicated by the first indication field.

15. The base station according to claim 14, wherein the time domain position of the ACK/NACK feedback information is one or a combination of following instances:

the radio frame comprising the time domain position of the ACK/NACK feedback information is a radio frame in which the first physical downlink control channel or the first physical downlink shared channel corresponding to the first physical downlink control channel is transmitted, or an n1-th radio frame after a radio frame in which the first physical downlink control channel or the first physical downlink shared channel corresponding to the first physical downlink control channel is transmitted, wherein n1 is a positive integer;

the half-frame comprising the time domain position of the ACK/NACK feedback information is a half-frame in which the first physical downlink control channel or the first physical downlink shared channel corresponding to the first physical downlink control channel is transmitted, or an n2-th half-frame after a half-frame in which the first physical downlink control channel or the first physical downlink shared channel corresponding to the first physical downlink control channel is transmitted, wherein n2 is a positive integer;

the sub-frame comprising the time domain position of the ACK/NACK feedback information is a sub-frame in which the first physical downlink control channel or the first physical downlink shared channel corresponding to the first physical downlink control channel is transmitted, or an n3-th sub-frame after a sub-frame in which the first physical downlink control channel or the first physical downlink shared channel corresponding to the first physical downlink control channel is transmitted, wherein n3 is a positive integer;

the slot comprising the time domain position of the ACK/NACK feedback information is a slot in which the first physical downlink control channel or the first physical downlink shared channel corresponding to the first physical downlink control channel is transmitted, or an n4-th slot after a slot in which the first physical downlink control channel or the first physical downlink shared channel corresponding to the first physical downlink control channel is transmitted, wherein n4 is a positive integer;

the mini-slot comprising the time domain position of the ACK/NACK feedback information is a mini-slot in which the first physical downlink control channel or the first physical downlink shared channel corresponding to the first physical downlink control channel is transmitted, or an n5-th mini-slot after a mini-slot in which the first physical downlink control channel or the first physical downlink shared channel corresponding to the first physical downlink control channel is transmitted, wherein n5 is a positive integer;

the TTI comprising the time domain position of the ACK/NACK feedback information is a TTI in which the first physical downlink control channel or the first physical downlink shared channel corresponding to the first physical downlink control channel is transmitted, or an n6-th TTI after a TTI in which the first physical downlink control channel or the first physical downlink shared channel corresponding to the first physical downlink control channel is transmitted, wherein n6 is a positive integer; and the symbol comprising the time domain position of the ACK/NACK feedback information is a symbol in which the first physical downlink control channel or the first physical downlink shared channel corresponding to the first physical downlink control channel is transmitted, or an n7-th symbol after a symbol in which the first physical downlink control channel or the first physical downlink shared channel corresponding to the first physical downlink control channel is transmitted, wherein n7 is a positive integer.

16. The base station according to claim 13, wherein the at least one processor is further configured to execute the computer readable program codes to:

if the base station determines a same time domain position of ACK/NACK feedback information indicated by first indication fields of a plurality of first physical downlink channels of the terminal, determine a concatenation order of ACK/NACK feedback information, of respective first physical downlink channels among the plurality of the first physical downlink channels or of first physical downlink shared channels corresponding to the respective first physical downlink channels, according to Downlink Assignment Index (DAI) indication fields in DCI of the plurality of the first physical downlink channels, and parse ACK/NACK feedback information received at the same time domain position according to the determined concatenation order.

* * * * *